United States Patent
Cowen et al.

(10) Patent No.: US 9,747,644 B2
(45) Date of Patent: Aug. 29, 2017

(54) TRANSACTION-HISTORY DRIVEN COUNTERFEIT FRAUD RISK MANAGEMENT SOLUTION

(71) Applicant: MasterCard International Incorporated, Purchase, NY (US)

(72) Inventors: Michael J. Cowen, London (GB); James Noe, West Wickham (GB); Mark Lulic, Mohegan Lake, NY (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 627 days.

(21) Appl. No.: 14/210,661

(22) Filed: Mar. 14, 2014

(65) Prior Publication Data

US 2014/0279309 A1    Sep. 18, 2014

Related U.S. Application Data

(60) Provisional application No. 61/786,963, filed on Mar. 15, 2013.

(51) Int. Cl.
*G07B 17/00* (2006.01)
*G06Q 40/00* (2012.01)
*G06Q 20/40* (2012.01)

(52) U.S. Cl.
CPC ......... *G06Q 40/12* (2013.12); *G06Q 20/4016* (2013.01)

(58) Field of Classification Search
USPC ......................................................... 705/30
See application file for complete search history.

(56) References Cited

U.S. PATENT DOCUMENTS

| 7,529,710 | B1* | 5/2009 | Clower ................. | G06Q 20/10 705/39 |
| 7,828,204 | B2  | 11/2010 | Fiebiger | |
| 8,584,936 | B2  | 11/2013 | Fiebiger | |
| 8,683,597 | B1* | 3/2014 | Johansson ............... | H04L 63/08 726/25 |
| 2003/0208439 | A1* | 11/2003 | Rast ....................... | G06Q 20/04 705/38 |
| 2004/0099732 | A1* | 5/2004 | Andrews ............... | G06Q 20/363 235/380 |
| 2004/0225776 | A1* | 11/2004 | DiRaimondo ....... | G06Q 20/347 710/200 |

(Continued)

OTHER PUBLICATIONS

Artificial neural network, downloaded from http://en.wikipedia.org/wiki/Artificial_neural_network on Dec. 26, 2012, pp. 1-16.

(Continued)

*Primary Examiner* — Ashford S Hayles
(74) *Attorney, Agent, or Firm* — Otterstedt, Ellenbogen & Kammer, LLP

(57) ABSTRACT

Transaction data is gathered for a plurality of successful payment device transactions in a first environment. The transaction data is filtered to identify successful payment device transactions associated with payment devices for which offline authentication is not supported, to obtain a whitelist. The whitelist is made available to at least one of (1) a merchant in a second, different environment, and (2) a third party acting on behalf of such a merchant.

16 Claims, 8 Drawing Sheets

(56) References Cited

U.S. PATENT DOCUMENTS

| | | | |
|---|---|---|---|
| 2006/0278704 A1* | 12/2006 | Saunders | G06Q 20/10 235/382 |
| 2007/0187491 A1* | 8/2007 | Godwin | G06Q 20/12 235/380 |
| 2008/0033880 A1 | 2/2008 | Fiebiger et al. | |
| 2008/0104186 A1* | 5/2008 | Wieneke | G06Q 10/107 709/206 |
| 2008/0128513 A1* | 6/2008 | Hammad | G06Q 20/12 235/492 |
| 2008/0135612 A1* | 6/2008 | Silbernagl | G06Q 30/0224 235/382 |
| 2008/0156873 A1 | 7/2008 | Wilhelm | |
| 2008/0183589 A1* | 7/2008 | Dixon | G06Q 20/027 705/17 |
| 2008/0183622 A1 | 7/2008 | Dixon | |
| 2008/0191009 A1* | 8/2008 | Gressel | G06Q 10/02 235/382 |
| 2008/0203170 A1* | 8/2008 | Hammad | G06K 17/00 235/492 |
| 2008/0288405 A1* | 11/2008 | John | G06Q 20/40 705/44 |
| 2009/0055646 A1* | 2/2009 | Sussland | G06F 21/445 713/168 |
| 2009/0119106 A1* | 5/2009 | Rajakumar | G06F 21/32 704/246 |
| 2009/0171682 A1* | 7/2009 | Dixon | G06Q 20/20 705/346 |
| 2009/0180777 A1* | 7/2009 | Bernard | H04J 3/1694 398/68 |
| 2009/0210299 A1 | 8/2009 | Cowen | |
| 2009/0265211 A1 | 10/2009 | May | |
| 2009/0283591 A1* | 11/2009 | Silbernagl | G06Q 20/04 235/382 |
| 2009/0285166 A1* | 11/2009 | Huber | G06Q 20/1235 370/329 |
| 2010/0075635 A1* | 3/2010 | Lim | H04W 4/08 455/411 |
| 2010/0145836 A1 | 6/2010 | Baker | |
| 2010/0224682 A1* | 9/2010 | Busch-Sorensen | H04L 9/3278 235/380 |
| 2010/0280958 A1* | 11/2010 | Hasson | G06Q 20/40 705/75 |
| 2010/0306107 A1* | 12/2010 | Nahari | G06Q 20/02 705/44 |
| 2011/0000962 A1* | 1/2011 | Chan | G06Q 20/20 235/382 |
| 2011/0022483 A1 | 1/2011 | Hammad | |
| 2011/0022517 A1* | 1/2011 | Hammad | G06Q 20/12 705/44 |
| 2011/0112918 A1* | 5/2011 | Mestr | G06Q 20/20 705/16 |
| 2011/0166914 A1* | 7/2011 | Dixon | G06Q 20/045 705/13 |
| 2011/0258434 A1* | 10/2011 | Qiu | H04L 9/006 713/153 |
| 2012/0011070 A1 | 1/2012 | Ward | |
| 2012/0143763 A1* | 6/2012 | Karp | G06Q 20/40 705/44 |
| 2012/0221381 A1* | 8/2012 | Dixon | G06Q 20/20 705/13 |
| 2013/0138565 A1* | 5/2013 | Dixon | G06K 17/00 705/44 |
| 2013/0144784 A1* | 6/2013 | Yang | G06Q 20/12 705/44 |
| 2013/0173357 A1* | 7/2013 | Lishak | G06Q 10/00 705/13 |
| 2013/0204880 A1* | 8/2013 | Lesiecki | G06F 17/30542 707/748 |
| 2014/0108251 A1* | 4/2014 | Anderson | G06Q 20/4016 705/44 |
| 2015/0134469 A1* | 5/2015 | White | G06Q 20/34 705/17 |

OTHER PUBLICATIONS

PCI Security Standards Council, downloaded from https://www.pcisecuritystandards.org/ on Dec. 26, 2012, pp. 1-4.

Payment Card Industry Data Security Standard, downloaded from http://en.wikipedia.org/wiki/PCI_DSS on Dec. 26, 2012, pp. 1-11.

PayPass Mag Stripe—Merchant Implementation Requirements, Jan. 2010, pp. 1-64.

PayPass—M/Chip Requirements, Dec. 5, 2011, pp. 1-78.

Data Mining Demo, downloaded from http://www.executionmih.com/data-mining/propensity-cluster-association-patterns.php on Dec. 26, 2012, pp. 1-4.

Propensity Models, 2008 MasterCard Advisors LLC, A MasterCard Worldwide Business, pp. 1-4.

Cluster analysis, downloaded from http://en.wikipedia.org/wiki/Cluster_analysis on Aug. 9, 2014, pp. 1-20.

Pang-Ning Tan et al., Introduction to Data Mining, downloaded from http://www-users.cs.umn.edu/~kumar/dmbook/index.php on Mar. 25, 2006, pp. 327-414 plus xiii-xxi.

Data mining, downloaded from http://en.wikipedia.org/wiki/Data_mining on Aug. 9, 2014, pp. 1-25.

Richard J. Povinelli, Identifying Temporal Patterns for Characterization and Prediction of Financial Time Series Events. Ph.D. Dissertation, Marquette University, 1999, pp. i-xiii and 1-180.

Sequential Pattern Mining, downloaded from http://en.wikipedia.org/wiki/Sequential_Pattern_Mining on Aug. 9, 2014, pp. 1-4.

Authorized Officer Lee W Young, ISA/US, International Search Report and Written Opinion, Jul. 30, 2014, PCT International Application PCT/US14/27322, pp. 1-9.

* cited by examiner

9,747,644 B2

TRANSACTION-HISTORY DRIVEN COUNTERFEIT FRAUD RISK MANAGEMENT SOLUTION

CROSS-REFERENCE TO RELATED APPLICATIONS

This patent application claims the benefit of U.S. Provisional Patent Application Ser. No. 61/786,963, filed Mar. 15, 2013, entitled TRANSACTION-HISTORY DRIVEN COUNTERFEIT FRAUD RISK MANAGEMENT SOLUTION, of inventors Michael J. Cowen et al. The complete disclosure of the aforesaid U.S. Provisional Patent Application Ser. No. 61/786,963, filed Mar. 15, 2013, including all its appendices, is expressly incorporated herein by reference in its entirety for all purposes.

FIELD OF THE DISCLOSURE

The present disclosure relates generally to the electronic and computer arts, and, more particularly, to apparatus and methods for electronic payment.

BACKGROUND OF THE DISCLOSURE

There is an interest in employing cash alternatives in a variety of environments. Such cash alternatives can include, for example, payment devices such as payment cards and the like. Indeed, devices, such as electronic devices, and particularly electronic payment devices (for example, so-called "smart cards") may be useful for a variety of payment and other applications.

One global payment industry standard is set forth in the EMV standards, discussed further below, which define the interaction between smart cards and smart card processing devices for financial transactions. There are standards based on ISO/IEC 7816 for contact cards, and standards based on ISO/IEC 14443 for contactless cards. MasterCard PayPass® is a "contactless" payment feature based on the ISO/IEC 14443 standard and the EMV contactless specifications that provides cardholders with a way to pay by tapping a payment card or other payment device, such as a phone or key fob, on a point-of-sale terminal reader. MasterCard PayPass® includes the MasterCard PayPass® M/Chip and MasterCard PayPass® Mag Stripe specifications. The latter is one example of a specification that allows chip payments (in particular, contactless chip payments) to use authorization networks (proprietary and shared) that presently only support magnetic stripe authorizations for credit or debit applications. PayPass® is a registered mark of, and the PayPass® specifications are available under license from, MasterCard International Incorporated of Purchase, N.Y., USA.

Modern chip-based payment cards or payment devices commonly employ a dynamic cryptogram generated by the card or other device for electronic detection and/or prevention of counterfeit fraud. In some cases (e.g., MasterCard PayPass® M/Chip using combined data authentication) the cryptogram can be validated offline by the terminal, but in others (e.g., MasterCard PayPass® Mag Stripe), the only place it can be validated is at the issuer host (usually during online authorization). Transit smart cards typically support some form of offline authentication (e.g. shared secret key). Remote authentication devices such as RSA SecureID support online authentication.

Under some circumstances it is desirable that a merchant be able to accept cards and/or devices where the merchant is unable to secure an online authorization response. One non-limiting example of such circumstances is in the transit environment. For example, US Patent Publication 2008/0033880 of Fiebiger et al. (now U.S. Pat. No. 8,584,936), assigned to MasterCard International Incorporated, published 7 Feb. 2008, and entitled "Techniques for Authorization of Usage of a Payment Device," indicates that it may be desirable, in a transit environment, to provide a rapid decision regarding transit access, such as in a time averaging less than 200 milliseconds (ms). This requirement generally renders online authorization impracticable.

SUMMARY OF THE DISCLOSURE

Principles of the disclosure provide techniques for transaction-history driven counterfeit fraud risk management. In one aspect, an exemplary method includes the steps of gathering transaction data for a plurality of successful payment device transactions in a first environment; filtering the transaction data to identify successful payment device transactions associated with payment devices for which offline authentication is not supported, to obtain a whitelist; and making the whitelist available to at least one of a merchant in a second, different environment, and a third party acting on behalf of the merchant.

In another aspect, another exemplary method includes gathering transaction data for a plurality of successful payment device transactions; filtering the transaction data to identify successful payment device transactions associated with payment devices for which offline authentication is not supported, to obtain a whitelist; making the whitelist available to at least one of a merchant and a third party acting on behalf of the merchant; and the at least one of the merchant and the third party acting on behalf of the merchant inferring authentication of at least one of the payment devices for which offline authentication is not supported, based on presence in the whitelist.

In still another aspect, an exemplary method includes the steps of, at at least one computer processor operated by or on behalf of a merchant, obtaining access to a whitelist including a list of payment devices for which offline authentication is not supported, and for which successful payment device transactions have previously been carried out; and, at the least one computer processor operated by or on behalf of the merchant, inferring authentication of at least one of the payment devices for which the offline authentication is not supported, based on presence in the whitelist.

In a still further aspect, still another exemplary method includes the steps of, at at least one computer processor operated by or on behalf of a merchant, obtaining access to a whitelist including a list of payment devices for which offline authentication is not supported, and for which successful payment device transactions have previously been carried out in an environment separate and distinct from an environment in which the merchant is located; and, at the least one computer processor operated by or on behalf of the merchant, making a risk management decision for at least one of the payment devices for which the offline authentication is not supported, based, at least in part, on presence of the at least one payment device on the whitelist.

Aspects of the disclosure contemplate the method(s) performed by one or more entities herein, as well as facilitating one or more method steps by the same or different entities. As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the disclosure or elements thereof can be implemented in the form of a computer program product including a tangible computer readable recordable storage medium with computer usable program code for performing the method steps indicated stored thereon in a non-transitory manner. Furthermore, one or more embodiments of the disclosure or elements thereof can be implemented in the form of a system (or apparatus) including a memory and at least one processor that is coupled to the memory and operative to perform exemplary method steps. Yet further, in another aspect, one or more embodiments of the disclosure or elements thereof can be implemented in the form of means for carrying out one or more of the method steps described herein; the means can include (i) specialized hardware module(s), (ii) software module(s) stored in a non-transitory manner in a tangible computer-readable recordable storage medium (or multiple such media) and implemented on a hardware processor, or (iii) a combination of (i) and (ii); any of (i)-(iii) implement the specific techniques set forth herein. Transmission medium(s) per se and disembodied signals per se are defined to be excluded from the claimed means.

One or more embodiments of the disclosure can provide substantial beneficial technical effects; for example:
  ability to infer authenticity of a payment device requiring online authentication without going online
  ability to 'pre-authenticate' a payment device without need for the provision of a pre-registration infrastructure (such as a website or self-service kiosks)
  reduced time criticality, inasmuch as pre-authentication is less time critical than deliberate pre-registration as it is based on prior activity rather than a deliberate step that must be taken after the decision to travel and prior to travel taking place (in the case of transit)

These and other features and advantages of the present disclosure will become apparent from the following detailed description of illustrative embodiments thereof, which is to be read in connection with the accompanying drawings.

DETAILED DESCRIPTION OF PREFERRED EMBODIMENTS

Some embodiments include gathering transaction data for a plurality of successful payment device transactions conducted over a payment network (e.g., a network that carries out payment card type transactions); and filtering the transaction data to identify successful payment device transactions associated with payment devices unsuitable for offline authentication. Pertinent information regarding payment devices and associated payment processing networks, as well as exemplary message flows for payment devices that are suitable and unsuitable for offline authentication, is presented below. Some embodiments also include carrying out propensity modeling on the successful payment device transactions associated with the payment devices incapable of offline authentication to identify a subset of the payment devices which are more likely to be used at a specific merchant; the result is a whitelist that is provided to the merchant. In a non-limiting example, the merchant may be a transit system; exemplary transit system implementations are discussed below.

Payment Devices and Associated Payment Processing Networks

Figure 1:
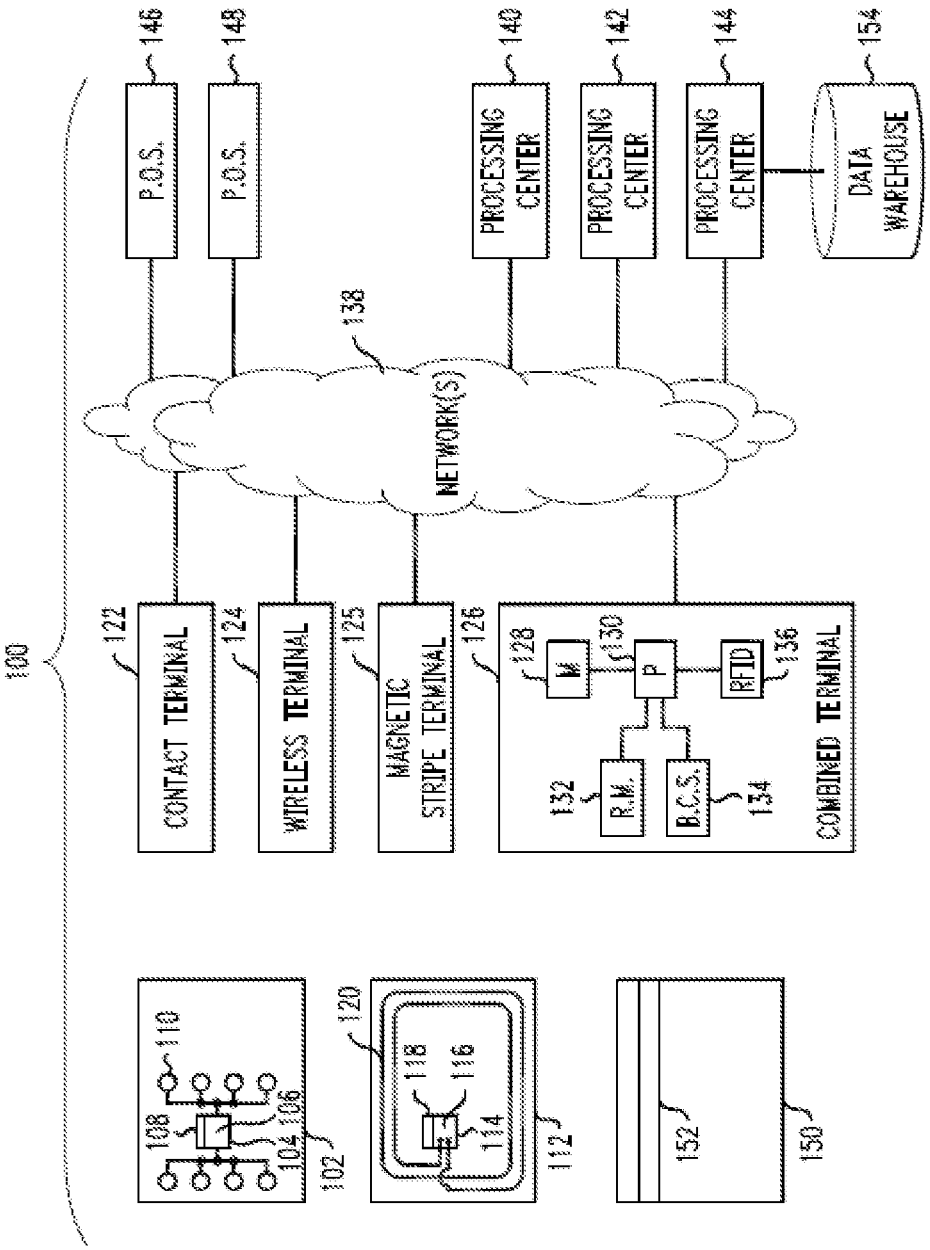
FIG. 1 shows an example of a system and various components thereof that can implement techniques of the disclosure.

Attention should now be given to FIG. 1, which depicts an exemplary embodiment of a system 100, according to an aspect of the disclosure, and including various possible components of the system. System 100 can include one or more different types of portable payment devices. For example, one such device can be a contact device such as card 102. Card 102 can include an integrated circuit (IC) chip 104 having a processor portion 106 and a memory portion 108. A plurality of electrical contacts 110 can be provided for communication purposes. In addition to or instead of card 102, system 100 can also be designed to work with a contactless device such as card 112. Card 112 can include an IC chip 114 having a processor portion 116 and a memory portion 118. An antenna 120 can be provided for contactless communication, such as, for example, using radio frequency (RF) electromagnetic waves. An oscillator or oscillators, and/or additional appropriate circuitry for one or more of modulation, demodulation, downconversion, and the like can be provided. Note that cards 102, 112 are exemplary of a variety of devices that can be employed. The system 100 per se may function with other types of devices in lieu of or in addition to "smart" or "chip" cards 102, 112; for example, a conventional card 150 having a magnetic stripe 152. In the case of magnetic stripe cards, part of the risk assessment (whether or not to accept the card) could be based on whether the card has a prior history of successful authorizations (in some instances, these could be filtered to identify authorizations 'in similar environments'). Furthermore, an appropriately configured mobile device (e.g., "smart" cellular telephone handset, tablet, personal digital assistant (PDA), and the like) can be used to carry out contactless payments in some instances.

The ICs 104, 114 can contain processing units 106, 116 and memory units 108, 118. Preferably, the ICs 104, 114 can also include one or more of control logic, a timer, and input/output ports. Such elements are well known in the IC art and are not separately illustrated. One or both of the ICs 104, 114 can also include a co-processor, again, well-known and not separately illustrated. The control logic can provide, in conjunction with processing units 106, 116, the control necessary to handle communications between memory unit 108, 118 and the input/output ports. The timer can provide a timing reference signal from processing units 106, 116 and the control logic. The co-processor could provide the ability to perform complex computations in real time, such as those required by cryptographic algorithms.

The memory portions or units 108, 118 may include different types of memory, such as volatile and non-volatile memory and read-only and programmable memory. The memory units can store transaction card data such as, e.g., a user's primary account number ("PAN") and/or personal identification number ("PIN"). The memory portions of units 108, 118 can store the operating system of the cards 102, 112. The operating system loads and executes applications and provides file management or other basic card services to the applications. One operating system that can be used to implement some aspects or embodiments of the present disclosure is the MULTOS® operating system licensed by MAOSCO Limited. (MAOSCO Limited, St. Andrews House, The Links, Kelvin Close, Birchwood, Warrington, WA3 7PB, United Kingdom) Alternatively, JAVA CARD™-based operating systems, based on JAVA CARD™ technology (licensed by Sun Microsystems, Inc., 4150 Network Circle, Santa Clara, Calif. 95054 USA), or proprietary operating systems available from a number of vendors, could be employed. Preferably, the operating system is stored in read-only memory ("ROM") within memory portion 108, 118. In an alternate embodiment, flash memory or other non-volatile and/or volatile types of memory may also be used in the memory units 108, 118.

In addition to the basic services provided by the operating system, memory portions 108, 118 may also include one or more applications. At present, one possible specification to which such applications may conform is the EMV interoperable payments specification set forth by EMVCo, LLC (901 Metro Center Boulevard, Mailstop M3-3D, Foster City, Calif., 94404, USA). It will be appreciated that applications can be configured in a variety of different ways.

It should be noted that the skilled artisan will be familiar with the EMV specifications. Nevertheless, out of an abundance of caution, the following documents are expressly incorporated herein by reference in their entirety for all purposes (the same are published by EMVCo and available on EMVCo's web site):

EMV Integrated Circuit Card Specifications for Payment Systems Book 1 Application Independent ICC to Terminal Interface Requirements Version 4.2 Jun. 2008

EMV Integrated Circuit Card Specifications for Payment Systems Book 2 Security and Key Management Version 4.2 Jun. 2008

EMV Integrated Circuit Card Specifications for Payment Systems Book 3 Application Specification Version 4.2 Jun. 2008

EMV Integrated Circuit Card Specifications for Payment Systems Book 4 Cardholder, Attendant, and Acquirer Interface Requirements Version 4.2 Jun. 2008

EMV Integrated Circuit Card Specifications for Payment Systems Book 1 Application Independent ICC to Terminal Interface Requirements Version 4.3 Nov. 2011

EMV Integrated Circuit Card Specifications for Payment Systems Book 2 Security and Key Management Version 4.3 Nov. 2011

EMV Integrated Circuit Card Specifications for Payment Systems Book 3 Application Specification Version 4.3 Nov. 2011

EMV Integrated Circuit Card Specifications for Payment Systems Book 4 Cardholder, Attendant, and Acquirer Interface Requirements Version 4.3 Nov. 2011

EMV Common Payment Application Specification (CPA) v. 1.0 March 2008

EMV Card Personalization Specification (CPS) v. 1.1 Jul. 2007

EMV Contactless Specifications for Payment Systems, including Book A: Architecture and General Requirements March 2011; Book B: Entry Point March 2011; Books C [C-1, C-2, C-3, C-4]: Kernel Specifications March 2011; Book D: Contactless Communication Protocol March 2011; EMV Contactless Specs v2.1 Disposition of Comments March 2011; as well as version 2.2—EMV Contactless Specifications for Payment Systems, including Book A: Architecture and General Requirements June 2012; Book B: Entry Point June 2012; Books C [C-1, C-2, C-3, C-4]: Kernel Specifications June 2012; Book D: Contactless Communication Protocol June 2012

EMVCo Mobile Contactless—EMV Profiles of GlobalPlatform UICC Configuration v. 1.0 December 2010

EMV Contactless Mobile Payment—Application Activation User Interface v. 1.0 December 2010

All Specification Bulletins published from time to time to change and/or clarify the above The skilled artisan will also be familiar with the above-mentioned MasterCard® PayPass™ specifications, available under license from MasterCard International Incorporated of Purchase, N.Y., USA (marks of MasterCard International Incorporated of Purchase, N.Y., USA).

As noted, cards 102, 112 are examples of a variety of payment devices that can be employed. The primary function of the payment devices may not be payment, for example, they may be cellular phone handsets that implement appropriate techniques. Such devices could include cards having a conventional form factor, smaller or larger cards, cards of different shape, key fobs, personal digital assistants (PDAs), appropriately configured cell phone handsets, or indeed any device with the appropriate capabilities. In some cases, the cards, or other payment devices, can include body portions (e.g., laminated plastic layers of a payment card, case or cabinet of a PDA, chip packaging, and the like), memories 108, 118 associated with the body portions, and processors 106, 116 associated with the body portions and coupled to the memories. The memories 108, 118 can contain appropriate applications. The processors 106, 116 can be operative to execute one or more steps. The applications can be, for example, application identifiers (AIDs) linked to software code in the form of firmware plus data in a card memory such as an electrically erasable programmable read-only memory (EEPROM).

A number of different types of terminals can be employed with system 100. Such terminals can include a contact terminal 122 configured to interface with contact-type device 102, a wireless terminal 124 configured to interface with wireless device 112, a magnetic stripe terminal 125 configured to interface with a magnetic stripe device 150, or a combined terminal 126. Combined terminal 126 is designed to interface with any combination of devices 102, 112, 150. Some terminals can be contact terminals with plug-in contactless readers. Combined terminal 126 can include a memory 128, a processor portion 130, a reader module 132, and optionally an item interface module such as a bar code scanner 134 and/or a radio frequency identification (RFID) tag reader 136. Items 128, 132, 134, 136 can be coupled to the processor 130. Note that the principles of construction of terminal 126 are applicable to other types of terminals and are described in detail for illustrative purposes. Reader module 132 can, in general, be configured for contact communication with card or device 102, contactless communication with card or device 112, reading of magnetic stripe 152, or a combination of any two or more of the foregoing (different types of readers can be provided to interact with different types of cards e.g., contacted, magnetic stripe, or contactless). Terminals 122, 124, 125, 126 can be connected to one or more processing centers 140, 142, 144 via a computer network 138. Network 138 could include, for example, the Internet, or a proprietary network (e.g., a virtual private network (VPN) such as is described with respect to FIG. 2 below). More than one network could be employed to connect different elements of the system. For example, a local area network (LAN) could connect a terminal to a local server or other computer at a retail establishment, in a transit station, etc. A payment network could connect acquirers and issuers. Further details regarding one specific form of payment network will be provided below. Processing centers 140, 142, 144 can include, for example, a host computer of an issuer of a payment device.

Many different retail or other establishments, represented by points-of-sale 146, 148, can be connected to network 138. Different types of portable payment devices, terminals, or other elements or components can combine or "mix and match" one or more features depicted on the exemplary devices in FIG. 1.

Portable payment devices can facilitate transactions by a user with a terminal, such as 122, 124, 125, 126, of a system such as system 100. Such a device can include a processor, for example, the processing units 106, 116 discussed above. The device can also include a memory, such as memory portions 108, 118 discussed above, that is coupled to the processor. Further, the device can include a communications module that is coupled to the processor and configured to interface with a terminal such as one of the terminals 122, 124, 125, 126. The communications module can include, for example, the contacts 110 or antennas 120 together with appropriate circuitry (such as the aforementioned oscillator or oscillators and related circuitry) that permits interfacing with the terminals via contact or wireless communication. The processor of the apparatus can be operable to perform one or more steps of methods and techniques. The processor can perform such operations via hardware techniques, and/or under the influence of program instructions, such as an application, stored in one of the memory units.

The portable device can include a body portion. For example, this could be a laminated plastic body (as discussed above) in the case of "smart" or "chip" cards 102, 112, or the handset chassis and body in the case of a cellular telephone.

It will be appreciated that the terminals 122, 124, 125, 126 are examples of terminal apparatuses for interacting with a payment device of a holder. The apparatus can include a processor such as processor 130, a memory such as memory 128 that is coupled to the processor, and a communications module such as 132 that is coupled to the processor and configured to interface with the portable apparatuses 102, 112, 150. The processor 130 can be operable to communicate with portable payment devices of a user via the communications module 132. The terminal apparatuses can function via hardware techniques in processor 130, or by program instructions stored in memory 128. Such logic could optionally be provided from a central location such as processing center 140 over network 138. The aforementioned bar code scanner 134 and/or RFID tag reader 136 can optionally be provided, and can be coupled to the processor, to gather attribute data, such as a product identification, from a UPC code or RFID tag on a product to be purchased.

The above-described devices 102, 112 can be ISO 7816-compliant contact cards or devices or NFC (Near Field Communications) or ISO 14443-compliant proximity cards or devices. In operation, card 112 can be touched or tapped on the terminal 124 or 128 (or an associated reader), which then contactlessly transmits the electronic data to the proximity IC chip in the card 112 or other wireless device.

One or more of the processing centers 140, 142, 144 can include a database such as a data warehouse 154.

Figure 2:
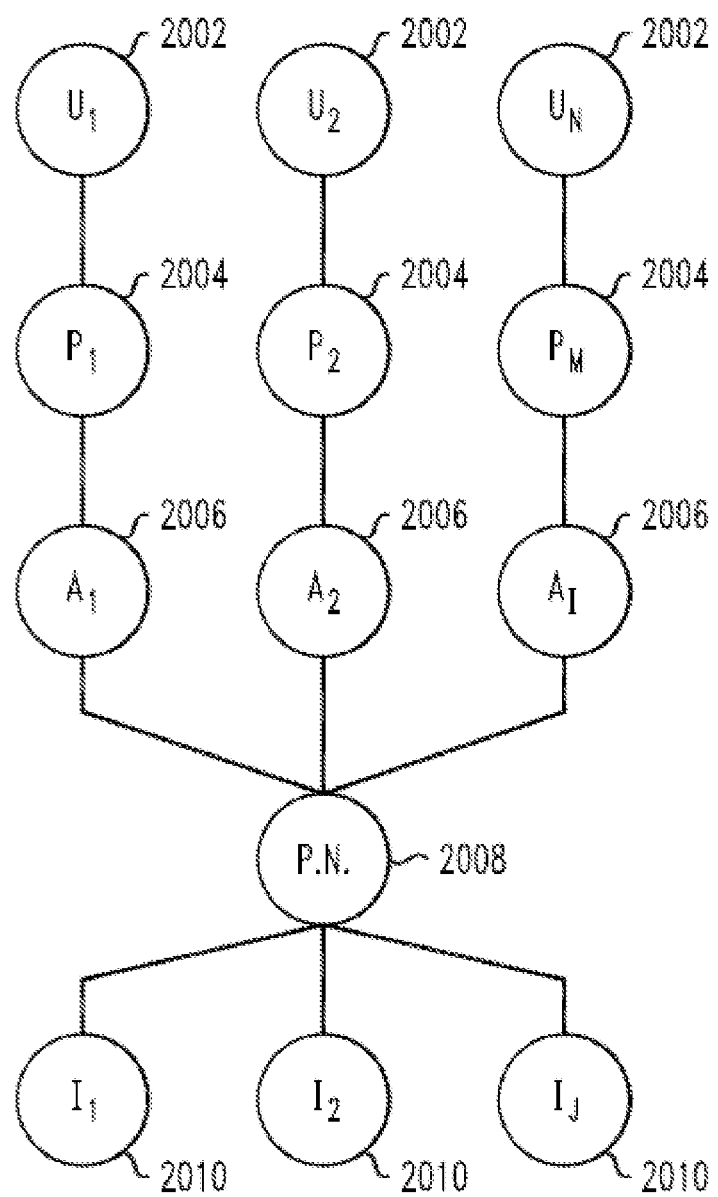
FIG. 2 depicts an exemplary inter-relationship between and among: a payment network configured to facilitate transactions between multiple issuers and multiple acquirers, a plurality of users, a plurality of merchants, a plurality of acquirers, and a plurality of issuers.

With reference to FIG. 2, an exemplary relationship among multiple entities is depicted. A number of different users (e.g., consumers) 2002, $U_1, U_2 \ldots U_N$, interact with a number of different merchants 2004, $P_1, P_2 \ldots P_M$. Merchants 2004 interact with a number of different acquirers 2006, $A_1, A_2 \ldots A_I$. Acquirers 2006 interact with a number of different issuers 2010, $I_1, I_2 \ldots I_J$, through, for example, a single operator 2008 of a payment network configured to facilitate transactions between multiple issuers and multiple acquirers; for example, MasterCard International Incorporated, operator of the BANKNET® network, or Visa International Service Association, operator of the VISANET® network. In general, N, M, I, and J are integers that can be equal or not equal.

During a conventional online credit authorization process, the cardholder 2002 pays for the purchase and the merchant 2004 submits the transaction to the acquirer (acquiring bank) 2006. The acquirer verifies the card number, the transaction type and the amount with the issuer 2010 and reserves that amount of the cardholder's credit limit for the merchant. At this point, the authorization request and response have been exchanged, typically in real time. Authorized transactions are stored in "batches," which are sent to the acquirer 2006. During subsequent clearing and settlement, the acquirer sends the batch transactions through the credit card association, which debits the issuers 2010 for payment and credits the acquirer 2006. Once the acquirer 2006 has been paid, the acquirer 2006 pays the merchant 2004.

The preceding paragraph describes an "online" transaction where communication with the issuer host takes place in real time. With the more recent chip-based cards (as opposed to cards whose only means of electronic data storage is a magnetic stripe), this typically provides a strong cryptographic check that the card is genuine. In an "offline" transaction, communication with the issuer host does not take place in real time and a local decision must be made regarding whether the transaction is to be permitted. As noted, with some kinds of payment cards or other payment devices a cryptogram can be validated offline by the terminal to provide offline authentication; other types of chip-equipped payment cards or other payment devices require going online to contact the issuer host to carry out authentication. In essence, the card and the terminal agree how they can best authorize the transaction. EMV and offline cardholder authentication methods allow a card and terminal to either approve a transaction offline (based on risk management parameters set by the issuer) or seek authorization online in the event that the transaction cannot be authorized or completed offline.

It will be appreciated that the network 2008 shown in FIG. 2 is an example of a payment network configured to facilitate transactions between multiple issuers and multiple acquirers, which may be thought of as an "open" system. Some embodiments of the disclosure may be employed with other kinds of payment networks, for example, proprietary or closed payments networks with only a single issuer and acquirer, as long as the network provides a mechanism by which cards' prior transaction activity can be analyzed. Furthermore in this regard, FIG. 2 depicts a four party model, as will be known to the skilled artisan; the four parties are the consumer 2002, merchant 2004, acquirer 2006, and issuer 2010. However, at least some embodiments are also of use with three-party models, wherein the acquirer and issuer (and in at least some instances, the network operator, as well) are the same entity; again, as long as the network provides a mechanism by which cards' prior transaction activity can be analyzed.

Messages within a network such as network 138 and/or network 2008, may, in at least some instances, conform to the International Organization for Standardization (ISO) Standard 8583, *Financial transaction card originated messages—Interchange message specifications*, which is the ISO standard for systems that exchange electronic transactions made by cardholders using payment cards. It should be noted that the skilled artisan will be familiar with the ISO 8583 standards. Nevertheless, out of an abundance of caution, the following documents are expressly incorporated herein by reference in their entirety for all purposes (published by ISO, Geneva, Switzerland, and available on the ISO web site):

ISO 8583 Part 1: Messages, data elements and code values (2003)
ISO 8583 Part 2: Application and registration procedures for Institution Identification Codes (IIC) (1998)
ISO 8583 Part 3: Maintenance procedures for messages, data elements and code values (2003)
ISO 8583:1993 (1993)
ISO 8583:1987 (1987)

As used herein, a "payment card network" is a communications network that uses payment card account numbers, such as primary account numbers (PANs), to authorize, and to facilitate clearing and settlement of, payment card transactions for credit, debit, stored value and/or prepaid card accounts. The card accounts have standardized payment card account numbers associated with them, which allow for efficient routing and clearing of transactions; for example, ISO standard account numbers such as ISO/IEC 7812-compliant account numbers. Some payment card networks connect multiple issuers with multiple acquirers; others use a three party model. Some payment card networks use ISO 8583 messaging. Non-limiting examples of payment card networks that connect multiple issuers with multiple acquirers are the BANKNET® network and the VISANET® network.

Exemplary Message Flows for Payment Devices that are Suitable and Unsuitable for Offline Authentication Giving attention now to FIG. 3, an example will be given of a standard transaction (PAYPASS MAGSTRIPE PROFILE). In such a normal transaction, in a preliminary step (not illustrated), the reader 132 and card 112 (understood to include other kinds of devices, as well), establish communications. Note that reader 132 was discussed somewhat generically above, but in the context of FIG. 3 includes at least a contactless reader. In other cases, a contact reader can be provided. In a first step 301, the SELECT (PPSE) command allows the reader 132 to find out what payment applications the card has. This information is returned in the PAYPASS PAYMENT DIRECTORY in step 302. In step 303, the reader selects an appropriate one of the applications using the SELECT command with the appropriate application identifier (AID) as an argument. Step 304 includes the return of FCI—File Control Information from selecting Proximity Payment Systems Environment (PPSE). Step 306 includes the card responding to the select application command telling the reader the information that it needs for the transaction—AIP (Application Interchange Profile) tells the reader how to conduct the transaction, while AFL (application file locator) tells the reader what records need to be read from the card in order to conduct the transaction. It may also specify the PDOL—Processing Data Objects List, which is data that the card needs from the reader in order to conduct the transaction as defined immediately hereinafter for step 305. In step 305, if the card asked for any specific data in step 304, the reader sends it in step 305, via the GET PROCESSING OPTIONS command. This step "says" to the card "tell me the basic context for the transaction. What do I need to read from you and what process shall we use?" The various commands and arguments are familiar to the skilled artisan from the EMV, PAYPASS® M/CHIP® & PAYPASS® MAG STRIPE standards (registered marks of MasterCard International Incorporated, Purchase, N.Y., USA).

In step(s) 307, data is read from the card, using the READ RECORD command, in a manner well-known in the art. Step 308 shows return of the records that have been read.

In step 317, the reader provides an unpredictable number (UN) and asks the card to compute a cryptographic checksum. In step 318, the card responds with the track 1 CVC3 (optional), the track 2 CVC3, and the Application Transaction Counter (ATC).

The process just described will now be reiterated and summarized. There is an initial exchange where the card and reader work out how to communicate and establish communication. Then, the application is selected at 303, wherein a "SELECT" command is sent from the reader to the card, giving the card the identity of the application the reader wants to select. The reader gets a response from the card at block 304 that says (the terms "say," "talk," and the like being understood to contemplate electronic communication), in essence, "here is a brief description of the card." The reader then sends the "GET PROCESSING OPTIONS" command to the card in step 305. This is, in colloquial terms, the reader saying to the card "I would like to conduct a transaction; let us work out the details of how we should proceed"; the reader says to the card "if you asked for any details to determine how we should communicate, here are those details," and the card says to the reader, in step 306, "here is the information that you need in order to know how to proceed with the transaction." The information basically tells the reader what to read from the card and what the context of the transaction is.

In step(s) 307, the reader takes from the card all of the information it needs, via a command called "READ RECORD." The data obtained includes the primary account number (PAN), expiry date, and track data. In some instances, the data obtained may also include a series of public key certificates that allow verification of the authenticity of the card's data and encryption of data sent to the card (e.g. confirmation that a PIN entered into the reader by the cardholder was successfully verified by the card).

In step 317, the reader provides an unpredictable number (UN) and asks the card to compute a cryptographic checksum.

Figure 3:
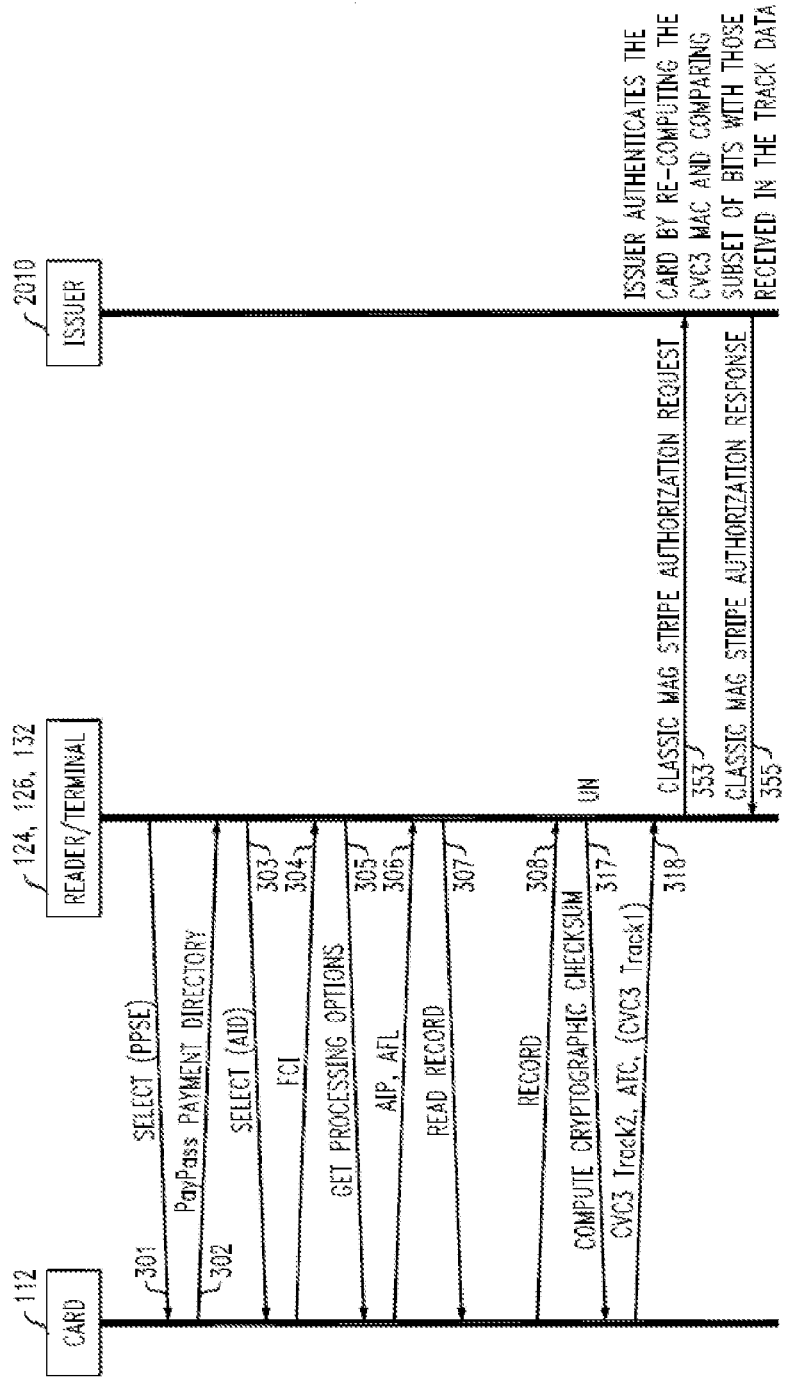
FIG. 3 is a message flow diagram depicting prior art techniques.

Still with reference to FIG. 3, the reader 132 and the terminal 124, 126 are depicted as a single entity in this instance.

The track 2 data, and the track 1 data if provided, are sent to the issuer host 2010, as shown at 353, within a conventional magnetic stripe authorization request. The conventional magnetic stripe authorization response is depicted at 355. Note "Classic Mag Stripe" is intended as a non-limiting example of conventional magnetic stripe messaging.

Note also that examples are provided in the context of a contactless transaction but in other instances, embodiments may be implemented in the context of a contacted transaction.

The skilled artisan will appreciate that payment devices are typically equipped with a card security code; non-limiting examples include the card verification code (CVC) and card verification value (CVV). Purely by way of a non-limiting example, the CVC3 (card verification code), employed by MasterCard International Incorporated, is a cryptographic checksum also known as a MAC. In a normal magnetic stripe transaction, a static three digit code is used. In some modern chip-based payment devices, dynamic cryptographic checksums are employed due to their greater strength and the fact that they are not subject to replay attacks. As indicated in US Patent Publication 2012-0011070 of Michael C. Ward et al., entitled "Apparatus and Method for Combining Cryptograms for Card Payments," assigned to MasterCard International Incorporated and incorporated herein by reference in its entirety, in current PayPass® Mag Stripe products and services, only selected bits from the CVC3 can be employed, inasmuch as additional data needs to be provided to the issuer, such as bits from the unpredictable number and the application transaction counter.

The skilled artisan will also appreciate that the application transaction counter (ATC) is a counter in the chip card, two bytes long, which increments every transaction, and is a fundamental security mechanism employed with both contacted and contactless chips. It is one wherein the card and issuer, by including the ATC in the cryptogram calculation, can ensure that a cryptogram (and associated data) validated by the issuer is not simply a copy of data used for another transaction. The ATC can also be helpful for low-level cryptographics, such as key derivation, and could in principle be used for detecting card clones irrespective of cryptography.

In addition, the skilled artisan will appreciate that the unpredictable number is a four-byte number which provides a way for the terminal to ensure that the transaction is not replayed but rather is fresh. It is part of what is known as a challenge and response protocol, wherein the terminal sends an unpredictable number to the card, and the card will include that number in its cryptogram, which is sent to the issuer host. In parallel with that, the terminal sends the unpredictable number to the issuer host, and the issuer uses same as part of verifying the cryptogram.

Figure 4:
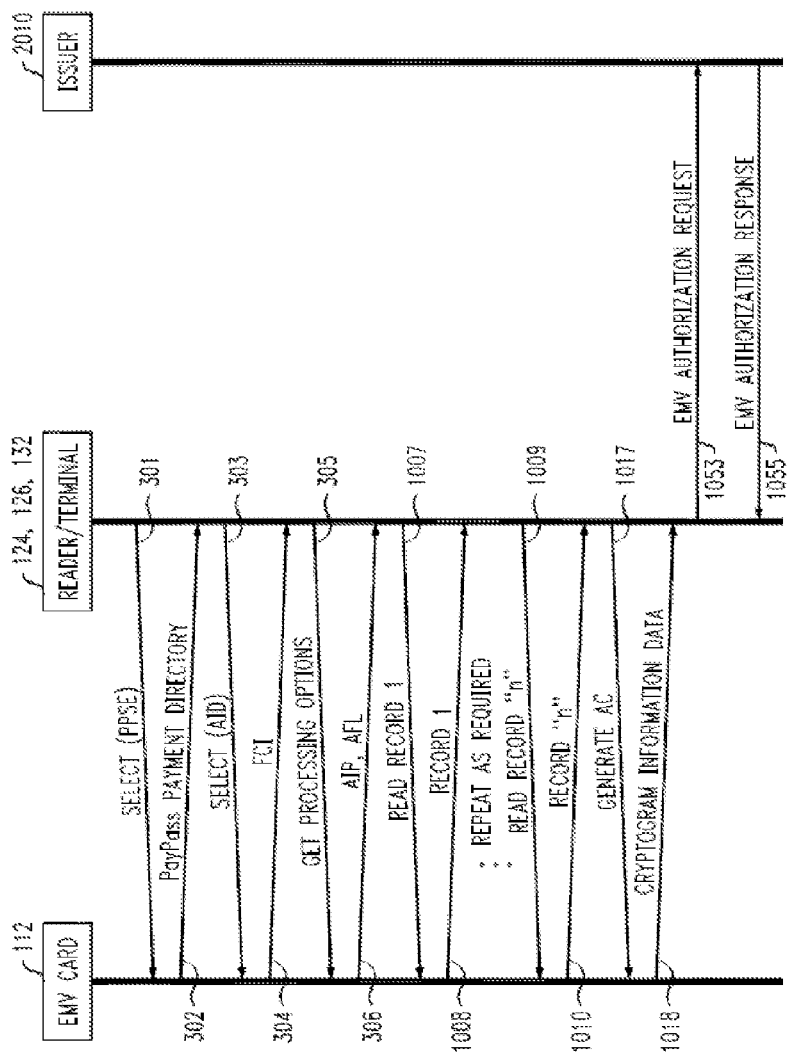
FIG. 4 is another message flow diagram depicting prior art techniques.

The ARQC is the EMV authorization request cryptogram, which is included in the authorization request sent to the issuer host (see exemplary EMV flows in FIG. 4).

The authorization request may conform, for example, to the ISO 8583 standard (proprietary sub-elements may also be included in some cases, as will be appreciated by the skilled artisan).

One or more embodiments may be implemented in the context of MasterCard PayPass® Mag Stripe products and services. The skilled artisan will appreciate that the same enables emulation of a magnetic stripe transaction with a chip card, with little or no impact on a magnetic-stripe payment card network (other than a small amount of extra data, such as the aforementioned ten bytes). Thus, in one or more embodiments, a contactless "smart" card interacts with a reader, but messaging within the payment network is analogous to that in a conventional transaction wherein a card with a magnetic strip is "swiped."

The PayPass® Mag Stripe specifications allow contactless chip payments to use authorization networks (proprietary and shared) that presently support magnetic stripe authorizations for credit or debit applications. The chip authentication process is performed between the chip embedded in the PayPass card 112 and the issuer 2010, which means that the additional functionality required in terminals to support PayPass® Mag Stripe specifications is minimal. There is also little impact on the acquirer host system, the authorization network and on other entities that may be involved in the transaction.

In the PayPass® Mag Stripe specifications, the card stores track 1 and track 2 data and a secret key for device authentication. Security is built around a dynamic Card Validation Code (CVC3) included in the discretionary data field of the track data. The CVC3 is generated by the card using a diversified secret key and the following input data:

The track data,
The Application Transaction Counter (ATC) of the card, and
The Unpredictable Number (UN) provided by the reader.

The general principle of operation is as follows: a card generates an authentication token for the issuer in the form of a dynamic CVC (CVC3). The CVC3, the UN and (part of) the ATC are sent to the issuer host in the discretionary data fields of the track 1 and track 2 data, requiring little or no modification to the acquirer systems and the networks that are presently used for magnetic stripe card authorizations.

As indicated at the lower right-hand side of FIG. 3, the issuer host authenticates the card by re-computing the CVC3 message authentication cryptogram (MAC) and comparing a subset of bits with those received in the track data. Refer, for example, to FIG. 3 of the aforementioned co-assigned US Patent Publication 2012-0011070. Thus, online communication with the issuer 2010 is required for authentication in the PayPass® Mag Stripe context, in the example shown in FIG. 3.

The PayPass® Mag Stripe specification considers the reader to be a peripheral device of the terminal. The reader performs the interaction with the card. It should be noted that in some instances, the terminal and reader are integrated into a single point-of-sale (POS) device while in others, they may be separate.

By way of review, consider a transaction in accordance with the PayPass® Mag Stripe specification. In a first step, terminal 124, 126 enables reader 132. In a second step, reader 132 sends UN to card 112. In a third step, card 112 sends dynamic CVC3 and ATC to reader 132. In a fourth step, reader 132 sends Data Record to terminal 124, 126. In a fifth step, terminal 124, 126 sends authorization data to a host of acquirer 2006. In a sixth step, the host of acquirer 2006 sends an ISO 8583 authorization request/0100 message on payment network 2008 (e.g., the BANKNET network). In a seventh step, payment network 2008 forwards ISO 8583 authorization request/0100 message to issuer 2010. In an eighth step, issuer 2010 responds with an ISO 8583 authorization response/0110 message. In a ninth step, payment network 2008 forwards ISO 8583 authorization response/ 0110 message to acquirer 2006. In a tenth step, the host of acquirer 2006 informs terminal 124, 126 about the outcome of the transaction (e.g., approval). Again, in the simplified view of FIG. 3, the terminal and reader are collapsed into a single entity.

Thus, a PayPass® Mag Stripe transaction can include the following operations. The terminal enables the reader. The reader creates a list of applications that are supported by both the card and reader, as at 302. The reader picks the highest priority application from the list of mutually supported applications, and issues the SELECT command to select the application on the card, as at 303. The reader issues the GET PROCESSING OPTIONS command to initiate the transaction on the card, as at 305. The card updates the ATC. The reader issues the READ RECORD command to retrieve the static data from the card, as at 307. Amongst other data objects, the Track 1 Data (optional) and Track 2 Data and the bitmaps are returned. The bitmaps inform the reader where the CVC3, the ATC and the UN are to be located in the discretionary data fields of the Track 1 Data and Track 2 Data. The reader generates the UN and issues the COMPUTE CRYPTOGRAPHIC CHECKSUM command, in 317. The card returns the CVC3s for the Track 1 Data and Track 2 Data and the ATC, in 318.

Based on the bitmaps returned in the response 308 from the READ RECORD, the reader inserts the CVC3, (part of) the ATC and the UN in the discretionary data fields of the Track 1 Data and Track 2 Data. The reader copies the number of UN digits ($n_{UN}$) in the least significant position of the discretionary data fields of the Track 1 Data and Track 2 Data. The reader prepares a Data Record for the terminal. The Data Record includes the Track 1 Data (if present) and Track 2 Data including the dynamic CVC3 data. The Data Record also includes the discretionary data fields of the Track 1 Data (if present) and Track 2 Data as returned by the card (i.e. without UN, ATC, CVC3 and $n_{UN}$ included). The Data Record may also include PayPass Third Party Data (e.g. loyalty data returned by the card), card data for receipt printing (e.g. Application Label, Application Preferred Name and Issuer Code Table Index) and the cardholder's language preference (Language Preference).

The reader transfers the data objects of the Data Record required by the terminal to the terminal. Depending on the product rules, the terminal may request the cardholder to enter the cardholder's PIN for online PIN processing or offline PIN processing (in which case the PIN is entered and sent to the card before the reader issues the COMPUTE CRYPTOGRAPHIC CHECKSUM command). The terminal formats the authorization request as for a magnetic stripe transaction and sends the authorization request to the issuer, as at 353. Upon receipt of the authorization request, the issuer verifies the CVC3 and processes the authorization in a similar way to a magnetic stripe card authorization, as at 355. Depending on the product rules, the terminal prints a receipt with a line for cardholder signature. Of course, usually a terminal would request either a PIN or a signature but not both.

It is worth noting that a variety of different cardholder verification methods (CVMs) can be employed in a variety of different contexts and/or with a variety of different products. For example, in MASTERCARD PAYPASS, acceptable cardholder verification methods are Online PIN, Signature, and On-Device Cardholder Verification; "no CVM" can optionally be employed for small transactions (e.g., less than or equal to a chargeback protection amount). In MASTERCARD PAYPASS MAGSTRIPE, the CVM is determined by the terminal; for example, in a similar way to swiped magnetic stripe transactions, based on the methods supported by the terminal.

FIG. 4 shows another example of a standard transaction (CONTACTLESS EMV PROFILE SUCH AS PAYPASS M/CHIP PROFILE). Steps similar to those in FIG. 3 have received the same reference character. In a first step 301, the SELECT (PPSE) command allows the reader 132 to find out what payment applications the card 112 has. This information is returned in the PAYPASS PAYMENT DIRECTORY in step 302. In step 303, the reader selects an appropriate one of the applications using the SELECT command with the appropriate application identifier (AID) as an argument. Step 304 includes the return of FCI—File Control Information from selecting Proximity Payment Systems Environment (PPSE). Step 306 includes the card responding to the select application command telling the reader the information that it needs for the transaction—AIP (Application Interchange Profile) tells the reader how to conduct the transaction, while AFL (application file locator) tells the reader what records need to be read from the card in order to conduct the transaction. It may also specify the PDOL—Processing Data Objects List, which is data that the card needs from the reader in order to conduct the transaction as defined immediately hereinafter for step 305. In step 305, if the card asked for any specific data in step 304, the reader sends it in step 305, via the GET PROCESSING OPTIONS command. This step "says" to the card "tell me the basic context for the transaction. What do I need to read from you and what process shall we use?" Again, the various commands and arguments are familiar to the skilled artisan from the EMV, PAYPASS® M/CHIP® & PAYPASS® MAG STRIPE standards (registered marks of MasterCard International Incorporated, Purchase, N.Y., USA).

In step 1007, data (RECORD 1) is read from the card, using the READ RECORD 1 command, in a manner well-known in the art. Step 1008 shows return of the data (RECORD 1) that has been read. This is repeated as required for "n" records, as indicated at READ RECORD "n" 1009 and RECORD "n" 1010.

In step 1017, the reader issues the GENERATE AC command. In step 318, the card responds with cryptogram information data.

Still with reference to FIG. 4, the reader 132 and the terminal 124, 126 are depicted as a single entity in this instance.

The EMV authorization request is sent to the issuer 2010, as shown at 1053. The EMV authorization response is depicted at 1055.

Several different types of offline authentication of the card or other device can be carried out in the context of the PAYPASS M/CHIP PROFILE system of FIG. 4. In this regard, offline data authentication is a cryptographic check to validate the card using public-key cryptography. There are three different processes that can be undertaken depending on the card:

Static data authentication (SDA) ensures data read from the card has been signed by the card issuer. This prevents modification of data.

Dynamic data authentication (DDA) provides protection against modification of data and cloning.

Combined DDA/generate application cryptogram (CDA) combines DDA with the generation of a card's application cryptogram to assure card validity. Support of CDA in devices may be needed, as this process has been implemented in specific markets. In some instances, this process might not be mandatory in terminals and would only be carried out where both card and terminal support it.

In each case, communication with the issuer is not currently required. Note that the security level provided by SDA is even further enhanced by DDA; the latter is in turn even further enhanced by CDA. Future systems may not accept SDA as a valid form of offline authentication and may therefore seek to force the transaction to go online.

Exemplary Transit Applications

Figure 5:
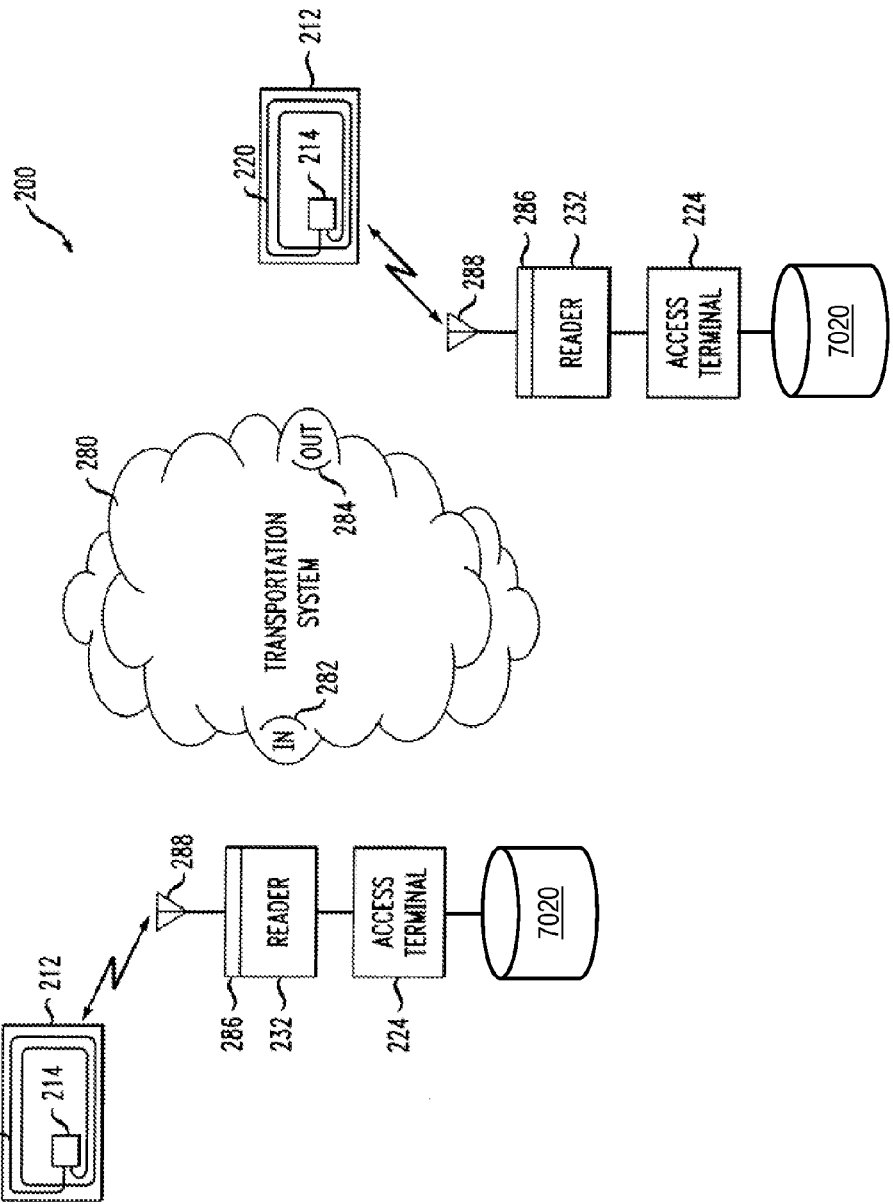
FIG. 5 shows one specific non-limiting exemplary application of techniques of the present disclosure to a transportation system.

Attention should now be given to FIG. 5, which depicts an exemplary system 200 applying certain techniques of the disclosure to an exemplary transportation system 280. It is to be understood that this is illustrative of one of many possible applications of techniques of the present disclosure. Passenger access to system 280 is controlled by portable payment devices 212 and terminals 224. Elements in FIG. 2 similar to those in FIG. 1 have received the same reference character incremented by 100 and will not be described in detail again. Thus, devices 212, chips 214, antennas 220, terminals 224 and reader modules 232 are similar to those discussed above with respect to FIG. 1. The reader modules can include communications circuitry 286 and antennas 288 for wireless communications with antennas 220. Contact, bar code, or magnetic stripe solutions could also be employed, in addition to or in lieu of contactless solutions. Aspects of one or more embodiments of the disclosure could also be employed with respect to magnetic stripe cards, for risk management purposes (as opposed to authentication).

When a passenger wishes to enter system 280, the passenger causes device 212 to communicate with access terminal 224 (for example by touching or tapping at a designated location, or holding in close proximity to such location). As used herein, "communicate with" is intended to cover both one and two-way cases, for example, a two-way communication scenario with a terminal and chip card, as well as a one-way scenario wherein a terminal simply reads a magnetic stripe card. The touching, tapping, or other communication may result, for example, in recordation of the passenger's activity to enable subsequent calculation of a fare owed. A turnstile or other entrance barrier may then permit passage through entrance 282 to trains or other modes of transportation. In some cases, a passenger must again present device 212 when exiting at exit 284, as a fare may depend on a distance traveled (indeed, the fare may depend on a variety of factors such as modes of transport used, whether any transfers took place during the journey, the distance travelled, the number of transit zones crossed, the time of day, whether or not the device entitles the bearer to any concessionary discount, and so on). In one or more embodiments, entrance at 282 is permitted in some instances if an identifier or the like of card 212 or other payment device is found in a local whitelist 7020 on or accessible to terminal/reader 224, 232. Whitelists are discussed further below in connection with FIG. 7.

Embodiments of the disclosure also contemplate additional method steps of opening a fare gate (for example, allowing a turnstile to turn) when appropriate; for example, when the card or other device is presented upon exit and/or entrance and passes any required checks.

It should be noted at this point that the complete disclosures of the following United States patents and United States patent application Publications are expressly incorporated herein by reference in their entireties for all purposes:

U.S. Pat. No. 7,828,204 of Fiebiger et al., issued Nov. 9, 2010, and entitled "Techniques for Authorization of Usage of a Payment Device"

US 2008/0033880 of Fiebiger et al., published 7 Feb. 2008, and entitled "Techniques for Authorization of Usage of a Payment Device" and its corresponding issued U.S. Pat. No. 8,584,936

US 2008/0156873 of Wilhelm et al., published Jul. 3, 2008, and entitled "Method And System For Using Contactless Payment Cards In A Transit System"

US 2009/0210299 of Michael J. Cowen, published Aug. 20, 2009, and entitled "Method and Apparatus for Simplifying the Handling of Complex Payment Transactions"

Figure 6:
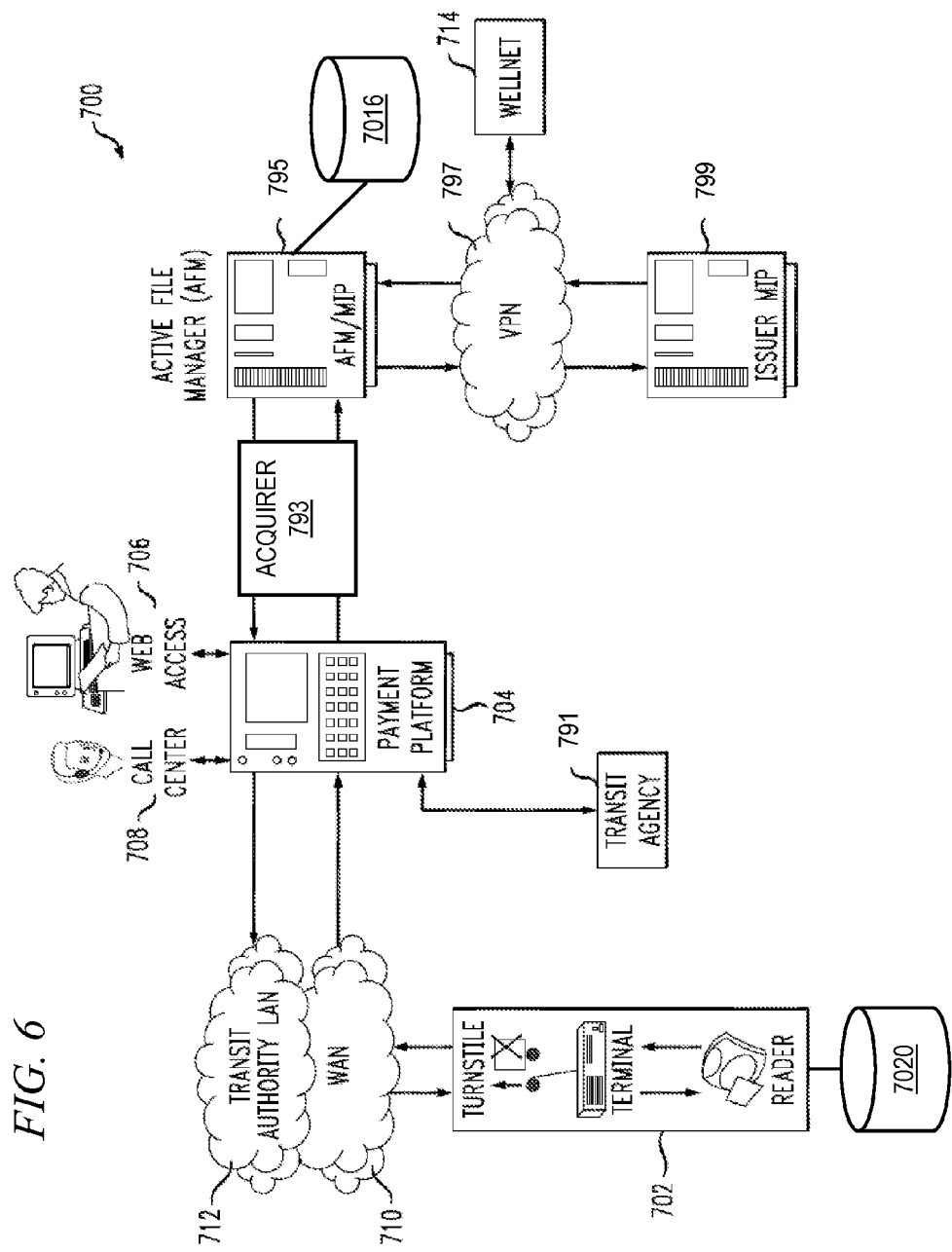
FIG. 6 is a system diagram of an exemplary transit solution that can implement techniques of the present disclosure.

Attention should now be given to FIG. 6, which depicts an exemplary detailed architecture for an exemplary automatic fare collection (AFC) solution 700. Note that elements 791, 793, and 797 generally correspond to elements 2004, 2006, and 2008, respectively, in FIG. 2. In general terms, three significant components of the system are the fare gate assembly (turnstile, reader and terminal) 702, payment platform 704, and active file manager (AFM) 795. The AFM 795 can be provided between acquirer 793 and VPN 797. AFM 795 could reside on the same machine as a conventional front end communications processor such as a MASTERCARD INTERFACE PROCESSOR™ or MIP™ processor (trademarks of MasterCard International, Inc. of Purchase, N.Y.), or could reside on a separate machine interfacing with such a conventional front end processor, which then interfaced with network 793. Another conventional front-end communications processor 799, such as a MIP™ processor, can be located, e.g., at the facility of an issuer to provide access to the aforementioned VPN 797. Platform 704 may optionally be in communication with assembly 702, for example, via WAN 710 and/or LAN 712. AFM 795 may also be in communication with platform 704, over a high speed communications network. In one or more embodiments, the connection between AFM 795 and platform 704 can be accomplished via a gigabit LAN connection.

In some cases, AFM 795 functions as a decision maker, going through appropriate criteria and performing a check for people attempting to access the transit system. Platform 704 functions as a record keeper, gathering records of ridership; keeping records of accounts; performing reconciliations and other accounting functions; updating account balances based on activity; facilitating registration; and so on. Platform 704 may also handle web access 706 and assist customer representatives in call center 708.

Still referring to FIG. 6, assembly 702 is preferably connected to platform 704 via a wide area network (WAN) 710 and/or a local area network (LAN) 712, such as that of a transit authority. The platform 704 may support the fare gate (broadly understood to include subway turnstiles, bus fare boxes, and the like) and account transactions by maintaining account statuses and routing requests and responses for authorization. Among the tasks that may be managed by platform 704 are:

- routing fare gate transaction activity between the transit agency reader/terminals and the AFM.
- managing the necessary funding options for contactless device customers and their associated accounts.
- hosting a transit agency-defined fare table and transfer rules (the fare rules may be defined by the transit agency, often as part of a public process, and the platform 704 typically does not change these rules; rather its function is to apply these rules to riders' accounts and applying these fare and transfer rules to riders' accounts—since fare rules reside here, calculations of complex fares, for example, depending on distance traveled or discounts, may be performed here). Note that in some cases, the master copy (of the whitelist) may also be held here with local copies held at the gates.
- preparing the information to facilitate clearing messages between transit agencies, their acquirers, and the operator of a payment card network, such as MasterCard International Incorporated.
- receiving and managing the transit agency's Restricted Card List (RCL) or similar hotlist.
- supporting customer service functionalities such as web site 706 and call center 708 interfaces.

"Well net" 714 is an optional monitoring and parameter management system for MIPs 795, 799.

Appropriate communications links may be provided between the platform 704 and the transit agency 791 and acquirer 793.

In one or more embodiments, entrance at 702 is permitted in some instances if an identifier or the like of a card or other payment device is found in a local whitelist 7020 on or accessible to assembly 702 and/or is found in a whitelist 7016 on or accessible to AFM 795. Whitelists are discussed further below in connection with FIG. 7.

In one or more embodiments, the payment platform 704 in FIG. 6 is a central server that performs various calculations. Payment platform 704 advantageously calculates fares, since this is typically where the fare rules reside. Payment platform 704 has access to ridership records and connectivity to the VPN 797, and preferably has access to any additional data needed to determine fares, such as, for example, personal entitlements and/or discounts and/or subsidies associated with the card. Under a different architecture, the functionality of elements 704, 795 could be combined in some instances.

By way of summary and provision of further detail, in many cases, a "transaction" will imply multiple (two or more) presentations of the card or other payment device, such as check-in and check-out, which determine the final fare. However, in some instances, only a single presentation is required, yet certain calculations (e.g., fare discount) may need to be performed to determine the amount due. In other instances, regardless of whether there are one or more presentations, no calculations are needed to determine the amount due.

It should be noted that one or more embodiments are applicable in a transit environment. FIGS. 5 and 6 provide a non-limiting example of one of many possible transit environments in which embodiments of the disclosure might be employed. Furthermore, embodiments of the disclosure can be employed in a variety of contexts besides transit, such as, for example, theme parks, theaters, stadiums or other event venues, museums, festivals, and the like. Indeed, one or more embodiments are applicable anywhere that real-time online authorization is not feasible (whether due to transaction speed constraints or availability of communication constraints, or both). Whitelists could be distributed by occasional/batched communications or even by manual data transfer devices (e.g. portable memory media); thus, some embodiments could be used in connection with vending machines or the like, with limited, or no, network connections. Thus transportation system 280 could also represent a theme park, theater, stadium or other event venue, museum, festival, and the like. In the broadest aspect, the entrance and exit could be the same or different physical locations. Even in a transport system, in some cases, this could be true; for example, a bus could have a single reader, terminal and entrance/exit door.

Modern chip-based payment cards or payment devices typically employ a dynamic cryptogram generated by the card or other device for electronic detection and/or prevention of counterfeit fraud. In some cases the cryptogram can be validated offline by the terminal, but in others, the only place it can be validated is at the issuer host (usually during online authorization). Under some circumstances it is desirable that a merchant be able to accept cards and/or devices where the merchant is unable to secure an online authorization response. In such a scenario, an unscrupulous individual might employ an electronic device such as a smart card or Near Field Communication (NFC) mobile phone to generate a completely random set of payment data (e.g. a 16-digit card number plus an expiry date and checksum) which is different every time the device is used and against which therefore the use of a hotlist (i.e., "blacklist" or list of known fraudulent cards) is ineffective.

In at least some circumstances, the inability to accept cards and/or devices where online authorization responses cannot be obtained leads to the rejection of transactions—these transactions which will be rejected due to the lack of an acceptable offline authorization process will still typically need to be processed by the merchant's own system, which will be slowed by the volume of the rejected transactions. Consequently, the time taken to process transactions which will be authorized is increased in such circumstances, which can lead, for example, to increased queuing and bunching at ticket barriers in mass transit systems, with concomitant potential personal safety issues and inconvenience.

One or more embodiments are particularly useful, for example, in those scenarios in which the merchant is unable to secure an online authorization which would also serve to indicate that the device had been successfully authenticated (one non-limiting example of such a scenario is at the transit gate where there is insufficient time to obtain an online authorization; similar issues may arise, for example, at the entrances to venues such as festivals, sporting venues, theatrical or musical venues, and the like). Another example is where a network connection is not readily available; e.g., a vending machine. In one or more embodiments, instead of authenticating the device in real-time, the merchant hosts a "whitelist" of devices which have previously been authenticated as part of their normal transactional activity at other merchants. It can be inferred that if such a device has previously transacted successfully at other merchants, then the transaction must have been successfully authorized, and therefore the device used must have been successfully authenticated. Furthermore in this regard, consider the possibility that the device used previously (and whose PAN is therefore on the whitelist) was genuine but the device subsequently accepted against the whitelist is a clone. This 'loophole' can be quickly closed by removing from the whitelist any PAN for which authorization is declined.

Accordingly, in one or more embodiments, historical transactional data is used to populate the whitelist, which can in turn be provided to such merchants (e.g. transit agencies) and which the merchants can in turn use to block (potentially) counterfeit primary account numbers (PANs) and allow known-valid PANs. In some cases, historical transactional data can further be used to reduce the whitelist to a more manageable size by profiling those cards and/or devices which are most likely to be used at a particular merchant, in a particular geography, at a particular time, and/or in a particular environment, and so on. A non-limiting example of a device which can (currently) only be authenticated at the issuer host is a PayPass Mag Stripe card. A non-limiting example of a merchant who may be unable to obtain an online authorization at the time the card and/or device is presented is a transit agency accepting cards at the turnstile (as high passenger throughput requirements dictate very fast transaction times).

It is worth noting that one or more embodiments mitigate counterfeit fraud (i.e. invented PANs). Other techniques can be used in combination with one or more embodiments to address skimming fraud (i.e. cloning of a genuine PAN). As noted just above, this 'loophole' can be quickly closed by removing from the whitelist any PAN for which authorization is declined.

Various schemes have heretofore been employed to control access to transit systems or the like with payment cards or other payment devices. Typically, these schemes do not involve a real-time exchange of authorization request and authorization response messages with the issuer host, since this would involve an excessive amount of time that is not feasible when people are lined up waiting to access a transit system. Typical schemes include hotlists, i.e., lists of cards that are fraudulent, stolen or otherwise disqualified, and whitelists, i.e., lists of cards associated with known acceptable accounts. If an identifier of a card or other device IS found on a HOTLIST, access is denied. If an identifier of a card or other device IS NOT found on a WHITELIST, access is denied. Where both types of check are being made, rather than a separate hotlist and whitelist there will typically be a single 'status list,' 'constructed list,' or 'active list' with either 'good' or 'bad' status indicated against each card/ID in the list.

One or more embodiments provide inventive techniques for constructing a whitelist. Heretofore, a whitelist has typically been constructed by some sort of an opt-in process; for example, some action the cardholder would carry out by himself or herself, such as accessing a web site or phoning a number, or something that the issuer would do on the cardholder's behalf One inventive aspect involves the recognition of the fact that an entity such as MasterCard International Incorporated of Purchase, N.Y., USA, which operates a payment processing network, has useful data about the card's prior activity which permits the assembly of the whitelist without the need for the cardholder to take deliberate action. It is to be emphasized that this activity is not identifiable to any individual; a number in a database is associated with a series of transactions in order to facilitate implementation of aspects of the disclosure; however, the data is maintained in an anonymous manner such that this number cannot be associated with an individual.

Figure 7:
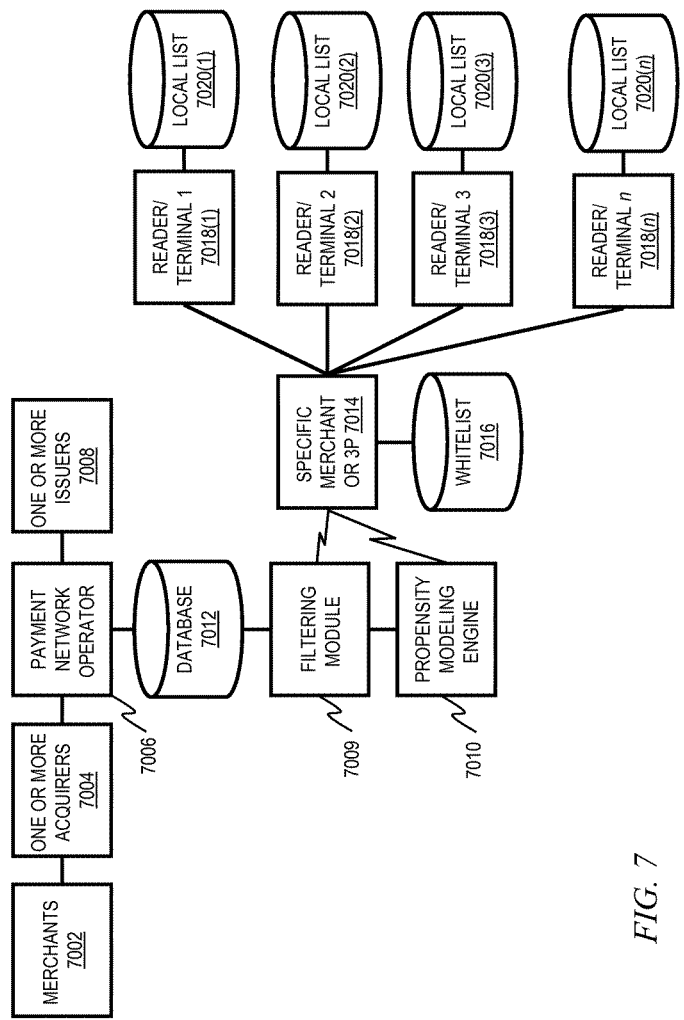
FIG. 7 is a block diagram of an exemplary embodiment of a system, in accordance with an aspect of the disclosure.

Reference should now be made to FIG. 7. In one or more embodiments, a whitelist is constructed by an entity such as an operator of a payment processing network 7006, and the whitelist is distributed out or otherwise made available, directly or indirectly to transit systems (or vendors who operate systems on their behalf) or other specific merchants 7014 or associated third parties (3Ps) that have a direct or indirect relationship with the operator of the payment network. For the avoidance of doubt, such distribution may be undertaken directly or indirectly. For example, it can be done through the acquirer; through the vendor; or direct to the merchant. The operator of payment processing network 7006 may be, for example, an entity such as 2008 in FIG. 2 that interconnects multiple issuers and multiple acquirers, or may correspond to a different type of payment network such as a closed or proprietary network; thus, the notation "one or more" acquirers 7004 and "one or more" issuers 7008. Various cardholders have cards or other payment devices and utilize them for various transactions at merchants 7002. The operator of payment processing network 7006 gathers appropriate data from the transactions and maintains a database 7012 (for example, somewhere within the payment network) for purposes such as facilitating resolution of any subsequent disputes that might arise from the transactions. As noted above, for purposes of one or more embodiments of the disclosure, activity is not identifiable to any individual.

In one or more embodiments, database 7012 is populated with records simply by virtue of transactions passing across the network 7006 from the acquirer 7004 to the issuer 7008 and vice-versa. In some cases, every transaction that passes through the network 7006 ends up in the data 7012. In at least some cases, the transactions are stored in the same or similar format that the messages are passed in. That is to say, an "authorization" message is stored as an "authorization" message; a "clearing" message is stored as a "clearing" message, and so on. So, for example, for each transaction, the authorization request, the authorization response, and the clearing messages are all stored. In one or more embodiments, data mining is then carried out on the records in database 7012; for example, using propensity modeling engine 7010.

Recall that one or more embodiments are useful in addressing situations involving certain cards or other payment devices, most obviously PayPass Mag Stripe cards, which require going online to the issuer host to authenticate them and check that they are genuine cards. That authentication is performed at the issuer's host. This creates difficulties in, e.g., the transit environment, where, when the card gets presented such as by tapping, there is insufficient time to go online and get an online authorization, which also includes an authentication, while the putative passenger is standing at the subway gate or other transit boarding point. In a somewhat simplified view of some embodiments disclosed in U.S. Pat. No. 7,828,204 and/or US 2008/0033880 (now U.S. Pat. No. 8,584,936), both of which represented a substantial advance in the state of the art, upon a first presentation of a card or other device, if same is not found on a hotlist (or for certain card/device types if same is found to be present on a whitelist), access to the transit system is permitted. An authorization request and response to the issuer are carried out without any effect on the initial access decision. If successful, the card is placed on a whitelist. If unsuccessful, the card is placed on a hotlist. The risk of allowing access is limited to the cost of a single transit ride, if the number (PAN) of the device remains fixed. However, these systems could potentially be defeated by a card or other device that generates a new number (PAN) for each transaction. Thus, in these systems, if the card or other device is allowed into the transit or other system without having been authenticated, it is not known at the moment access was granted if a genuine card with those details ever existed, and thus, it is not known whether there is an account that sits behind the card. The card number (PAN) could be a completely invented (made up) card number.

Thus, in these kinds of systems, the putative rider is in essence automatically allowed in upon first presentation of the card or other device, and then a payment "authorization" request is subsequently carried out, and the system will not allow the card or other device in again unless the authorization request is successful. This approach works if there is a card or other device with a static number. If a fraudster is using a device that generates a new number each time, the approach of these systems is no longer functional as each occurrence of a newly generated number allows the fraudster a further free entry.

One or more embodiments advantageously address this issue by permitting the inference of authenticity based on historical data. In particular, in one or more embodiments, while authenticity cannot be guaranteed because a real-time authentication is not carried out, nevertheless authenticity can be inferred based on the historical data within the database 7012. In some cases, a first pass is made through all of the transactions in the database 7012, and all of the transactions associated with cards or other devices not capable of satisfactory offline authentication are retrieved; for example, with filtering module 7009 or engine 7010. One example of such devices is the PayPass Mag Stripe card.

Note that this card type can be identified in the transaction data. Note also that other card types exhibit this problem as well; e.g., some PayPass M/Chip cards are designed to always go online and also don't support any offline authentication. Furthermore, there are also PayPass M/Chip SDA cards which support static authentication. In the latest version of the reader specification, MasterCard PayPass—MChip Reader Specification V3.0.1 (May 2012), expressly incorporated by reference herein in its entirety for all purposes, SDA is not accepted as a as a strong enough form of offline authentication and thus additional online authorization from the issuer host is required. Thus, in systems adhering to this latest version of the reader specification, use of SDA cards may still be permitted; however, since they can no longer be authenticated offline and can only be authenticated online, and that approach is not suitable for applications such as transit, a whitelist system in accordance with one or more embodiments of the disclosure can be employed as mitigation for the lack of authentication.

In particular, in such cases, the presence of the card on the whitelist indicates that the card number of the card in question is a genuine account number that has a PayPass product associated with it. When the card is tapped or otherwise presented, it typically cannot be determined whether it is a genuine card or a "clone" of that card. However, protection can be provided against a device that presents a different number every time. Thus, rogue cards can be shut down after one tap. By way of clarification, essentially, two counterfeit and/or fraud types will be considered. One type is, as mentioned above, a nefarious device which presents a different card number every time it is tapped. Even if placed on a hotlist (blacklist), this will not be an effective way to stop such a device because the next time it will look like a different card. The second type is a clone, where a fraudster somehow obtains the details of a genuine card and then makes a (fake) copy of that card. The whitelisting solution in accordance with one or more embodiments of the disclosure will help to defend against the first type, but not against the latter. However, the latter type is a much more manageable problem because such cards can be quickly stopped by means of a hotlist (blacklist). Thus, one or more embodiments disclosed in U.S. Pat. No. 7,828,204 and/or US 2008/0033880 (now U.S. Pat. No. 8,584,936) work well in situations where the number remains the same, because even if a single entry is tolerated and it turns out to be fraudulent, since the number is static, it will be known that the card has been compromised by cloning, and in the future, further transactions will not be permitted, and thus at most one fare is lost.

Continuing now with the description of FIG. 7, transaction data is present in database 7012, including, e.g., all the authorization requests, all the authorization responses, and all the clearing data, and now data mining is being carried out in that database. As noted, in some instances, the first filter is the card type; i.e., the records are filtered by card types that are vulnerable to the issues discussed (cards that cannot be authenticated offline). One issue that may be encountered in one or more embodiments is that the initial filtering could generate a list with tens of millions of cards in it. It should be noted that in some embodiments, it is desired to distribute the generated whitelist to be held locally at every single reader in the system (note readers/terminals 7018(1), 7018(2), 7018(3) . . . 7018(n) with local lists 7020(1), 7020(2), 7020(3) . . . 7020(n), respectively. A list with tens of millions of cards would potentially be too big to manage in such a fashion. In particular, such a list may be too big to store, and additionally, searching it in a short enough timeframe becomes challenging.

Accordingly, in one or more embodiments, the next phase is to reduce the list to something of more manageable size. In one or more embodiments, propensity modeling is employed to winnow down the number of entries on the list. Using suitable techniques, a determination is made as to whether a particular card or device is likely to be used at a specific merchant 7014—purely by way of a non-limiting example, a specific transit system, such as the transit system in a major European city. Again, by way of example, a determination can be made as follows: (1) Is the card an active PayPass Magstripe card (or other card that cannot be authenticated offline)? (2) Is the card being used regularly, i.e., regularly tapped; is it being used in general? (3) Has the card shown a prior propensity to travel overseas (if the specific merchant is overseas from the cardholder's account)? (4) Has the card been used in a specific location of interest (e.g., major European city) before? Many different patterns can be searched for in order to filter the list down to a more manageable size.

Thus, in one or more embodiments, all transaction data associated with the payment network operator 7006 is stored in database 7012. Then, an initial "cut" is made by identifying data associated with cards or other devices that cannot be authenticated offline. The result could be stored, for example, in database 7012 as an "unfiltered whitelist." Further filtering or winnowing can then be carried out as described above (for example, with propensity modeling engine 7010), to obtain a merchant-specific whitelist. This merchant-specific whitelist can be communicated to the specific merchant 7014 either directly or via a third party using any suitable technique. This merchant-specific whitelist can alternatively be communicated to (directly or indirectly), and held and operated by, a third party on behalf of the merchant. Exemplary communication techniques include communication over a wired or wireless network (e-mailed or made available on a server), by sending a physical medium, etc., as indicated by the jagged lines connecting engine 7010 and module 7009 with merchant/3P 7014. Specific merchant 7014 then stores the specific whitelist, as seen at 7016 (in some cases, this whitelist is not merchant-specific as no merchant-specific propensity modeling is carried out in some embodiments). Optionally, merchant 7014 then distributes merchant-specific whitelist 7016 to all its readers as described above, as indicated by the lines connecting specific merchant 7014 with readers/terminals 7018(1), 7018(2), 7018(3) . . . 7018(n).

As noted, in an alternative approach, the "unfiltered" whitelist can be sent to merchant 7014 which carries out its own propensity modeling (in a non-limiting example, on its own data, and in any event, in accordance with all applicable privacy laws, rules, regulations, procedures, and ethical guidelines).

Many different forms of data mining could be applied by propensity modeling engine 7010. In essence, an attempt is made to take a large amount of data and to try to extract from it a meaningful smaller amount of data. One or more embodiments are not dependent on the specific mechanism used for data mining.

Furthermore in this regard, data mining propensity modeling is, in and of itself, known to the skilled artisan. Propensity modeling works on discovering a natural inclination or tendency across variables. Some embodiments employ neural networks. Other pertinent techniques include Cluster Analysis, Association Analysis and Sequential/Temporal patterns. Thus, the data for many individual cards could be placed in database 7012 and clusters of individual cards with similar propensities to be used at a specific merchant 7014 could be developed; an association function could be used to identify affinities or patterns; and/or or sequential and/or temporal pattern functions could be used to analyze the database records over a period of time to identify trends. In some instances, use can be made of Enterprise Marketing Platform products and/or services available from MasterCard Global Products & Solutions, MasterCard International Incorporated, Purchase, N.Y., USA, or a similar customer relationship management engine or hub.

It is worth noting that in one or more embodiments, data collection and propensity modeling are preferably implemented using engine 7010 and database 7012 located at a node in a network that connects one or more issuers and one or more acquirers (e.g., BANKNET, VISANET, or the like).

Many different approaches can be taken to propensity modeling. One approach is a neural network where the desired result is defined, namely, cards that are likely to turn up and for which use is likely to be attempted at the specific merchant of interest (e.g., the transit system in a major European city). The neural network is given an input set of data and an example of the output data that is desired and then the neural network runs a learning process. When the result of the learning process is applied to an updated version of the input data, the desired results are obtained. The computer is provided with sample input data and sample output data and the computer implementing the artificial neural network works out how to get from one to the other. Then, when the computer implementing the artificial neural network is provided with a new set of input data, it returns the correct set of output data. Thus, one or more embodiments feed known data into a neural network analyzer for learning purposes, and then feed new data into the neural network analyzer that has completed the training process, to predict, for example, which individual cards will show up in the aforementioned major European city and be used to attempt travel on the transport system in the future.

As noted, in one or more embodiments, once a specific whitelist has been constructed, it is distributed to a client such as a specific merchant 7014; e.g., by e-mail, making available on a server, sending physical media, or any other suitable approach. In one or more embodiments, there are two aspects to this distribution. There is the distribution to the end party (e.g., transit agency or other specific merchant 7014), as indicated by the jagged line, and the distribution within the end party's network (e.g., from merchant 7014 to readers/terminals 7018(1), 7018(2), 7018(3) . . . 7018(n)). In a non-limiting example, the end party 7014 is a mass transit system such as one in a major European city and the end points are all of their readers across their network (e.g., at each subway or underground turnstile or fare gate). In one or more embodiments, both kinds of distribution are preferably carried out in a secure manner, inasmuch as real card data for good cards is being passed.

In a non-limiting example, the initial report run on the database 7012 would produce a list of PAN, expiry date, and PAN sequence number; i.e., enough data to uniquely identify a card or other payment device. The data may need to be hashed or tokenized in some manner for security and/or to facilitate a look-up process. The skilled artisan will appreciate that PCI DSS requirements forbid storage in the clear; otherwise the network could potentially be broken into and card numbers harvested. Furthermore in this regard, the Payment Card Industry Data Security Standard (PCI DSS) is a proprietary information security standard for organizations that handle cardholder information for the major debit, credit, prepaid, e-purse, ATM, and POS cards. Defined by the Payment Card Industry Security Standards Council, the standard was created to increase controls around cardholder data to reduce payment card fraud via its exposure.

In addition to hashing or tokenization for security, in some embodiments, data may be stored in a particular way to make the resulting file as small as possible so that the list consumes as little memory as possible, and also to make the look-up as fast as possible. The skilled artisan will be familiar with fast look-up algorithms per se, and, given the teachings herein, will be able to select one or more appropriate fast look-up algorithms to implement one or more embodiments.

It will be appreciated that one scenario where one or more embodiments are particularly useful is in situations when there is a requirement for interoperability with a mix of products, some of which can and some of which cannot be authenticated locally (i.e., without going online) For example, a transit agency, in a jurisdiction where typical cards are capable of offline authentication, may wish to be able to accept US-issued PayPass cards which are not configured for offline authentication. UK-issued cards don't have a problem because they all support CDA and can be authenticated at the reader. The preceding is but one non-limiting example. In another aspect, considering only US-based merchants and cards, the "master" whitelist having every single active PayPass card in the US on it could be a starting point, with propensity modeling to predict use in, e.g., New York, Chicago, Washington, and so on. The final list after propensity modeling might, in this case, be significantly larger than in the example of a transit system in Europe, since a much bigger number of US cards are likely to be used somewhere in the US as compared to Europe.

It will be appreciated that one or more embodiments address one or more technical problems discussed herein; for example, the technical problem of inferring offline authentication of a payment card or other payment device that can only be truly authenticated online; the technical problem of carrying out risk management for a payment card or other payment device that can only be truly authenticated online; and/or the technical problem of queuing and bunching at ticket barriers in mass transit systems with the concomitant processing time and personal safety issues.

Recapitulation

Given the discussion thus far, it will be appreciated that, in general terms, an exemplary method, according to an aspect of the disclosure, includes the step of gathering transaction data for a plurality of successful payment device transactions. For example, payment network operator 7006 (using a computer processor) stores in database 7012 authorization request, authorization response, and/or clearing (by way of example and not limitation, ISO 8583) messages for transactions at merchants 7002 routed to acquirer(s) 7004, over the network, to issuer(s) 7008, and/or back in reverse order. An additional step includes (using a computer processor) filtering the transaction data to identify successful payment device transactions associated with payment devices for which offline authentication is not supported (i.e., not possible, or possible but no longer acceptable due to enhanced security requirements—by way of a non-limiting example, if the reader allows SDA as a form of offline authentication then SDA cards would be accepted without needing to be on the whitelist. If the reader does not allow SDA then an SDA card would have to be on the whitelist in order to be accepted). This filtering step results in a whitelist.

Non-limiting examples of such devices for which offline authentication is not supported include those conforming to the PayPass Mag Stripe specification and those conforming to the PayPass M/Chip specification but being configured for only static data authentication (SDA). As used herein "authentication" is the ability to differentiate between a genuine device and a fraudulent version of that device; i.e., authentication per se involves verifying that the device itself is a legitimate device without concern about what the device is attached to, the account, the cardholder. As used herein, offline authentication is a cryptographic check to validate the card or other payment device using public-key cryptography, which check is undertaken between the card or other device and the reader without going online to contact the issuer of the card or other device.

Examples of types of payment devices for which offline authentication is not supported include PayPass Mag Stripe, PayPass M/Chip SDA, PayPass M/Chip without offline CAM, and magnetic stripe cards. Some such devices may be capable of offline authentication, but not a sufficiently strong offline authentication to be acceptable in some scenarios; e.g., capable of SDA only.

An optional further step includes (using a computer processor) carrying out propensity modeling on the whitelist containing the successful payment device transactions associated with the payment devices incapable of the offline authentication to identify a subset of the payment devices incapable of the offline authentication which are likely to be used at a specific merchant 7014, to obtain a further-refined whitelist. This step can be omitted in some embodiments. The filtering and propensity modeling steps can be carried out, for example, with propensity modeling engine 7010. Note that the forgoing is exemplary; the initial filtering can be carried out by the propensity modeling engine but this need not be the case. It could be carried out with a filtering module 7009 such as a database module that formulates an appropriate query to database 7012. Filtering module 7009 could be separate and distinct from propensity modeling engine 7010 or could be part of same, or propensity modeling engine 7010 could be omitted where propensity modeling is not to be carried out.

A still further step includes making the whitelist 7016 available to the merchant 7014 and/or third party acting on the merchant's behalf (e.g. transit vendor operating on behalf of a transit system). As discussed elsewhere herein, the whitelist can be made available using a variety of techniques; either directly, or indirectly through an intermediary. It will be appreciated that the whitelist 7016, 7020 is ultimately made available to some type of computing device (including a processor) of the merchant 7014 and/or third party acting on the merchant's behalf (e.g., a central server or other computer, such as AFM 795, and/or reader/terminal devices 702, 7018).

In one or more embodiments, the gathering, filtering, propensity modeling, and providing steps are carried out without requiring deliberate action by holders of the payment devices for which offline authentication is not supported, other than normal usage of the payment devices as shown at 7002, 7004, 7006, 7008.

In some instances, the gathering involves gathering transaction data for the plurality of successful payment device transactions in a first environment, and the merchant is in a second environment. For purposes of inferring authentication, gathering could also involve gathering in the same environment as the merchant.

As noted, the whitelist can be provided from the operator 7006 to the specific merchant 7014 and/or third party acting on the merchant's behalf using many different techniques, and can be provided directly from the operator 7006 to the merchant 7014 and/or third party acting on the merchant's behalf, or indirectly. One type of indirect provision is via an acquirer of the merchant. As will be known to the skilled artisan, an acquirer is an organization (e.g. bank or bank and associated processing entity) that is in the business of processing credit card transactions for businesses (acceptors). Note that merchant 7014 may or may not be one of the merchants 7002. However, since merchant 7014 wishes to permit use of payment cards or other devices used in transactions at 7002, 7004, 7006, 7008, merchant 7014 typically has an acquirer connected to network 7006, which may or may not be one of the acquirers 7004. Furthermore in this regard, suppose the merchant is a transit operator in a major European city and one of the payment devices in question is a US-based PayPass Mag Stripe card. This card may have been previously used at the transit operator, in which case merchant 7014 is also one of merchants 7002, and the acquirer of merchant 7014 is also one of acquirers 7004. However, the card may not have been previously used at the transit operator, in which case merchant 7014 is not one of merchants 7002, yet there may be factors that suggest it will be used at the transit operator. For example, it has been used to purchase airplane tickets for travel to the aforementioned major European City from New York, or it has been used to make purchases, other than from the transit operator, in or near the aforementioned major European City. Where merchant 7014 is not one of merchants 7002, its acquirer may or may not be one of acquirer(s) 7004. Another example of indirect provision is from operator 7006 to the merchant 7014 via a vendor which provides at least a portion of an access control solution to the merchant (e.g., a vendor which provides platform 704 in FIG. 6).

In one or more embodiments, merchant 7014 or third party acting on its behalf infers authentication for at least one payment device of the subset of payment devices, based on presence of the at least one payment device of the subset of payment devices on the whitelist 7016 provided to the merchant. For the avoidance of doubt, the physical card or other device itself is not physically present in the list, but rather some suitable identifier of the card or other device is on the list 7016. In some cases, the whitelist data includes, for each device, PAN, expiry date, and PAN sequence number. Furthermore, such suitable identifier can be hashed and/or tokenized for security, reduced file size and/or faster lookup. In this regard, pertinent security requirements imposed by any applicable rules, regulations, procedures, and/or standards should always be fully complied with in any actual implementation; however, from a purely patent law standpoint, such hashing and/or tokenization is optional unless expressly recited in a particular claim.

Of course, for devices for which offline authentication is supported, the transit system, transit system vendor, or other merchant or third party acting on its behalf may simply process transactions normally without regard to the whitelist.

As noted, one or more embodiments can be employed with many different kinds of merchants 7014; a transit system is one non-limiting example. In such instances, the result of inferring authentication from presence on the whitelist for a device for which offline authentication is not supported can be permitting access to the transit system (e.g., as in FIG. 5, list 7020 is distributed to access terminals 224 and readers 232 and used in the decision whether to grant access to the transit system). On the other hand, if authentication cannot be inferred for a device for which offline authentication is not supported, access may be denied. It will be appreciated that this aspect helps to defeat payment devices that report a new account number with each successive use.

In addition to inferring authentication, some embodiments can be used for risk management. For example, in the case of magnetic stripe cards, part of the risk assessment (whether or not to accept the card) could be based on whether the card has a prior history of successful authorizations (in some instances, these could be filtered to identify authorizations 'in similar environments'). Thus, in some cases, the method further includes the merchant and/or third party acting on behalf of the merchant making a risk management decision for at least one payment device of the subset of the payment devices, based, at least in part, on presence of the at least one payment device of the subset of the payment devices on the whitelist.

It is worth noting that in a closed-loop transit scheme, the party accepting the cards is also the owner of the credential that allows the cards to be authenticated. The transit system owns the keys that allow the cards to be authenticated, as well as the infrastructure that accepts the cards. When the transit system desires to accept general-purpose payment cards (e.g., MASTERCARD cards or VISA cards), the issuer of the card is in possession of the authentication credential. The issuer might make available services that provide assurances of authentication to the transit system, either using the sort of public key cryptography that enables offline authentication, or by responding to an on-line authorization request. Without the issuer doing this, the transit authority has no way to authenticate the cards. Note that this discussion is applicable to payment devices other than cards and card acceptors other than transit systems.

In some instances, the merchant 7014 or its cooperating third party distributes the whitelist to a plurality of payment device readers operated by or on behalf of the merchant, as seen at 7020(1) through 7020(n). In other cases, distribution down to the reader level may not be needed. For example, in FIG. 6, the whitelist could reside on the active file manager 795, by itself or as part of a file akin to a "constructed file" as described in the above-referenced US Patent Publication 2008-0033880 (now U.S. Pat. No. 8,584, 936); such a constructed file may include elements of both a "whitelist" and a "hotlist" or "blacklist." In some instances, some embodiments in US Patent Publication 2008-0033880 (now U.S. Pat. No. 8,584,936) determine if the account number of a card or other device has been presented in a given system before; if not, in some instances access is granted and then an authorization is performed; if the authorization is not successful, the card is placed on something akin to a "hotlist." As noted, this technique may be vulnerable to nefarious devices which present a new card number each time. This technique could, for example, be modified such that if the account number of a card or other device has not been presented in a given system before, access is not granted unless the card is found on a whitelist prepared and distributed as described herein Various determinations can be made during the propensity modeling step. For example, in some cases, the propensity modeling includes determining which of the payment devices incapable of offline authentication have been regularly used; optionally, in such cases, propensity modeling further includes determining which of the payment devices incapable of offline authentication which have been regularly used have been used in a geographical region associated with the merchant. Other factors could also be used for propensity modeling (e.g. purchase of airline tickets, or the current location of a mobile phone which has in some manner been associated with the card or other payment device).

As noted, in some cases, the propensity modeling includes conducting a learning process with an artificial neural network analyzer; and applying the artificial neural network analyzer which has undergone the learning process to the successful payment device transactions associated with the payment devices incapable of the offline authentication to identify the subset of the payment devices incapable of the offline authentication which are likely to be used at a specific merchant, to obtain the (further refined) whitelist. In such cases, engine 7010 can include an artificial neural network analyzer.

In one or more embodiments, the gathering, filtering, propensity modeling, and providing steps are carried out by an operator of a payment processing network 7006 which carries the plurality of successful payment device transactions; the transaction data for the plurality of successful payment device transactions is received by the operator over the payment processing network; and the filtering and propensity modeling steps are carried out by at least one hardware processor 820 located at a node of the payment processing network.

In some cases, a further step includes providing a system, wherein the system includes distinct software modules, each of the distinct software modules being embodied on a non-transitory computer-readable storage medium, and wherein the distinct software modules include a database module implementing database 7012 and a filtering module 7009. In such cases, in the gathering step, the transaction data for the plurality of successful payment device transactions is stored using the database module executing on the at least one hardware processor located at the node of the payment processing network; and the filtering steps is carried out by the filtering module executing on the at least one hardware processor located at the node of the payment processing network. All of the identified components could be on separate computers or could be software modules on the same computer or any mixture of the two. A propensity modeling engine module could be used to implement propensity modeling engine 7010 where propensity modeling is desired. The filtering module could be part of the propensity modeling engine or part of the database module.

In some instances, a method includes gathering transaction data for a plurality of successful payment device transactions (e.g., from database 7012); filtering the transaction data to identify successful payment device transactions associated with payment devices for which offline authentication is not supported (e.g., with filtering module 7009 or propensity modeling engine 7010), to obtain a whitelist; making the whitelist available to at least one of a merchant and a third party acting on behalf of the merchant; and the at least one of the merchant and the third party acting on behalf of the merchant inferring authentication of at least one of the payment devices for which offline authentication is not supported, based on presence in the whitelist (7016 or 7020). The successful transactions could, but need not be, in the same environment as the merchant or third party.

Any of the methods herein can also be re-focused on the merchant or third party as well; for example, the merchant or third party can receive a list of the kind described and infer authentication and/or carry out risk management based on same. Thus, in still another aspect, an exemplary method includes the steps of, at at least one computer processor operated by or on behalf of a merchant (e.g., processor 820 of a server or other computer of entity 7014 such as AFM/MIP 795), obtaining access to a whitelist (e.g., 7016, filtered or unfiltered) including a list of payment devices for which offline authentication is not supported, and for which successful payment device transactions have previously been carried out; and, at the least one computer processor operated by or on behalf of the merchant, inferring authentication of at least one of the payment devices for which the offline authentication is not supported, based on presence in the whitelist.

In a still further aspect, still another exemplary method includes the steps of, at at least one computer processor operated by or on behalf of a merchant (e.g., processor 820 of a server or other computer of entity 7014 such as AFM/MIP 795), obtaining access to a whitelist (e.g., 7016, filtered or unfiltered) including a list of payment devices for which offline authentication is not supported, and for which successful payment device transactions have previously been carried out in an environment (e.g., North America) separate and distinct from an environment in which the merchant is located (e.g., Europe); and, at the least one computer processor operated by or on behalf of the merchant, making a risk management decision for at least one of the payment devices for which the offline authentication is not supported, based, at least in part, on presence of the at least one payment device on the whitelist.

System and Article of Manufacture Details

Embodiments of the disclosure can employ hardware and/or hardware and software aspects. Software includes but is not limited to firmware, resident software, microcode, etc. Software might be employed, for example, in connection with one or more of AFM/MIP 795; a payment platform 704; an issuer MIP 799; a terminal 122, 124, 125, 126; a reader 132; reader/terminals 7018; a host, server, and/or processing center 140, 142, 144 (optionally with data warehouse 154) of a merchant, issuer, acquirer, processor, or operator of a network 2008, 797, 7006 operating according to a payment system standard (and/or specification); server implementing engine 7010 and/or database 7012; and the like. Firmware might be employed, for example, in connection with payment devices such as cards 102, 112, as well as reader 132.

Figure 8:
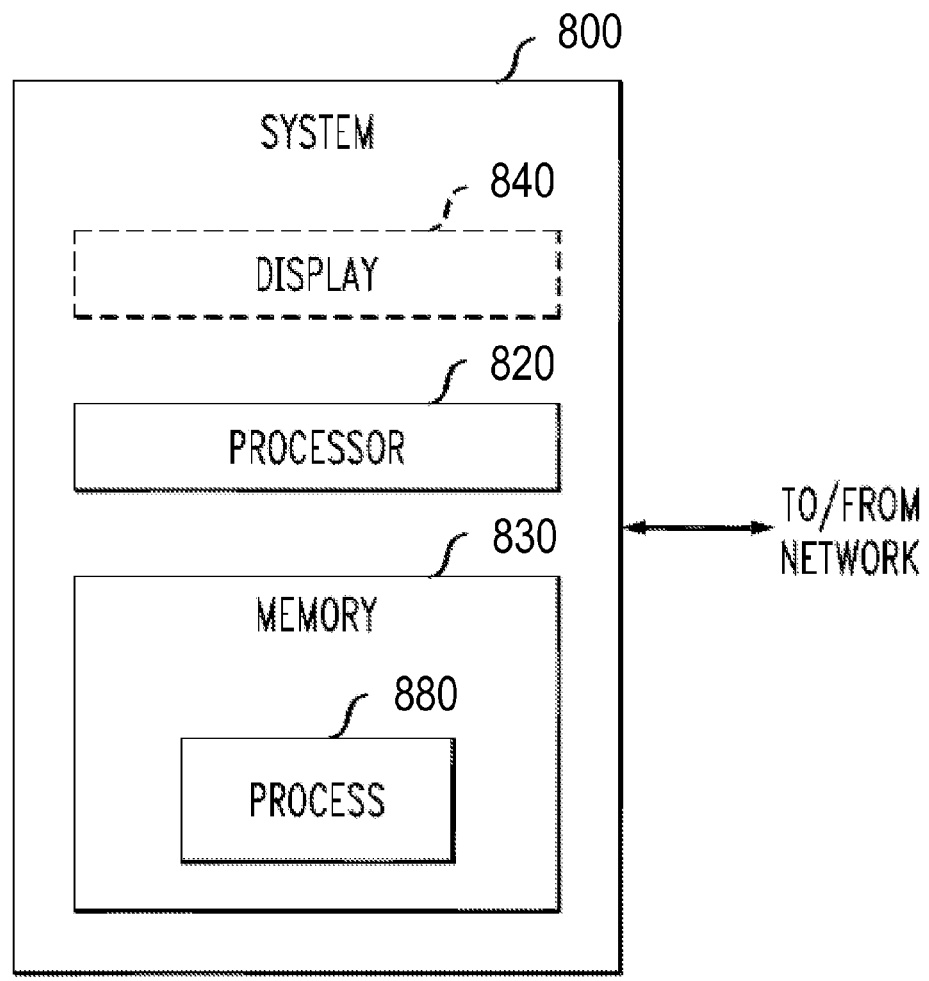
FIG. 8 is a block diagram of an exemplary computer system useful in one or more embodiments of the disclosure.

FIG. 8 is a block diagram of a system 800 that can implement part or all of one or more aspects or processes of the disclosure. As shown in FIG. 8, memory 830 configures the processor 820 (which could correspond, e.g., to processor portions 106, 116, 130; a processor of a terminal or a reader 132, 7018; processors of remote hosts in centers 140, 142, 144; processors of hosts and/or servers implementing various functionality; a processor of an AFM/MIP 795; a processor of a payment platform 704; a processor of an issuer MIP 799; processor of a server implementing engine 7010 and/or database 7012; and the like); to implement one or more aspects of the methods, steps, and functions disclosed herein (collectively, shown as process 880 in FIG. 8). Different method steps can be performed by different processors. The memory 630 could be distributed or local and the processor 820 could be distributed or singular. The memory 830 could be implemented as an electrical, magnetic or optical memory, or any combination of these or other types of storage devices (including memory portions as described above with respect to cards 102, 112). It should be noted that if distributed processors are employed, each distributed processor that makes up processor 820 generally contains its own addressable memory space. It should also be noted that some or all of computer system 800 can be incorporated into an application-specific or general-use integrated circuit. For example, one or more method steps could be implemented in hardware in an ASIC rather than using firmware. Display 840 is representative of a variety of possible input/output devices (e.g., displays, printers, keyboards, mice, touch pads, and so on).

As is known in the art, part or all of one or more aspects of the methods and apparatus discussed herein may be distributed as an article of manufacture that itself comprises a tangible computer readable recordable storage medium having computer readable code means embodied thereon. The computer readable program code means is operable, in conjunction with a computer system, to carry out all or some of the steps to perform the methods or create the apparatuses discussed herein. A computer-usable medium may, in general, be a recordable medium (e.g., floppy disks, hard drives, compact disks, EEPROMs, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic medium or height variations on the surface of a compact disk. The medium can be distributed on multiple physical devices (or over multiple networks). For example, one device could be a physical memory media associated with a terminal and another device could be a physical memory media associated with a processing center. As used herein, a tangible computer-readable recordable storage medium is defined to encompass a recordable medium (non-transitory storage), examples of which are set forth above, but does not encompass a transmission medium or disembodied signal.

The computer systems and servers described herein each contain a memory that will configure associated processors to implement the methods, steps, and functions disclosed herein. Such methods, steps, and functions can be carried out, by way of example and not limitation, by processing capability on elements 122, 124, 125, 126, 140, 142, 144, 132, 2004, 2006, 2008, 2010, 795, 7010, 7012, 7016, 7018, 7020, and the like, or by any combination of the foregoing. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

Thus, elements of one or more embodiments of the disclosure, such as, for example, 122, 124, 125, 126, 140, 142, 144, 132, 2004, 2006, 2008, 2010, 795, 7010, 7012, 7016, 7018, 7020, and the like, can make use of computer technology with appropriate instructions to implement method steps described herein. Some aspects can be implemented, for example, using one or more servers which include a memory and at least one processor coupled to the memory. The memory could load appropriate software. The processor can be operative to perform one or more method steps described herein or otherwise facilitate their performance.

Accordingly, it will be appreciated that one or more embodiments of the disclosure can include a computer program comprising computer program code means adapted to perform one or all of the steps of any methods or claims set forth herein when such program is run on a computer, and that such program may be embodied on a computer readable medium. Further, one or more embodiments of the present disclosure can include a computer comprising code adapted to cause the computer to carry out one or more steps of methods or claims set forth herein, together with one or more apparatus elements or features as depicted and described herein.

As used herein, including the claims, a "server" includes a physical data processing system (for example, system 800 as shown in FIG. 8) running a server program. It will be understood that such a physical server may or may not include a display, keyboard, or other input/output components. A "host" includes a physical data processing system (for example, system 800 as shown in FIG. 8) running an appropriate program.

Furthermore, it should be noted that any of the methods described herein can include an additional step of providing a system comprising distinct software (broadly construed in this context to be inclusive also of firmware) modules embodied on one or more tangible computer readable storage media. All the modules (or any subset thereof) can be on the same medium, or each can be on a different medium, for example. The modules can include any or all of the components shown in the figures. In one or more embodiments, the modules include a database module implementing database 7012, a filtering module 7009, and/or a propensity modeling engine module implementing engine 7010. The method steps can then be carried out using the distinct software modules of the system, as described above, executing on the one or more hardware processors. Further, a computer program product can include a tangible computer-readable recordable storage medium with code adapted to be executed to carry out one or more method steps described herein, including the provision of the system with the distinct software modules. Given the teachings herein, the skilled artisan will appreciate that the filtering module could be implemented, for example, as a database management system that formulates an appropriate query to database 7012. The database 7012 per se may be stored on suitable non-volatile storage such as a hard disk or the like. Given the teachings herein, the skilled artisan will appreciate that the propensity modeling engine module could be implemented, for example, as an artificial neural network analyzer including code to implement neural network analysis; alternatives include a cluster analyzer including code to implement cluster analysis, an association analyzer including code to implement association analysis, and a sequential/temporal pattern analyzer including code to implement sequential/temporal pattern analysis.

Computers discussed herein can be interconnected, for example, by one or more of network 138, 2008, 797, 7006, another virtual private network (VPN), the Internet, a local area and/or wide area network (LAN and/or WAN), via an EDI layer, and so on. Note that elements 2008, 7006 represent both the networks and their operators. The computers can be programmed, for example, in compiled, interpreted, object-oriented, assembly, and/or machine languages, for example, one or more of C, C++, Java, Visual Basic, COBOL, Assembler, and the like (an exemplary and non-limiting list), and can also make use of, for example, Extensible Markup Language (XML), known application programs such as relational database applications queried by structured query language (SQL) or other suitable query techniques, spreadsheets, and the like. The computers can be programmed to implement the logic depicted in the figures.

In some instances, messaging and the like may be in accordance with the International Organization for Standardization (ISO) Specification 8583 *Financial transaction card originated messages—Interchange message specifications* and/or the ISO 20022 or UNIFI Standard for Financial Services Messaging, also incorporated herein by reference in its entirety for all purposes.

Although illustrative embodiments of the present disclosure have been described herein with reference to the accompanying drawings, it is to be understood that the disclosure is not limited to those precise embodiments, and that various other changes and modifications may be made by one skilled in the art without departing from the scope or spirit of the disclosure.

What is claimed is:

1. A method comprising the steps of:
gathering transaction data for a plurality of successful payment device transactions in a first environment, said successful payment device transactions being carried over a payment processing network;
filtering said transaction data to identify successful payment device transactions associated with payment devices for which offline authentication is not supported, to obtain a whitelist, wherein said filtering is carried out by at least one hardware processor located at a node of said payment processing network;
carrying out propensity modeling on said whitelist to identify a subset of said payment devices for which said offline authentication is not supported which are more likely than a remainder of said payment devices for which said offline authentication is not supported to be used at a specific merchant, to obtain a further-refined whitelist, wherein said propensity modeling is carried out by at least one hardware processor located at said node of said payment processing network, said propensity modeling in turn comprising:
said at least one hardware processor conducting a learning process with an artificial neural network analyzer; and
said at least one hardware processor applying said artificial neural network analyzer which has undergone said learning process to said successful payment device transactions associated with said payment devices for which said offline authentication is not supported to identify said subset of said payment devices for which said offline authentication is not supported which are more likely than said remainder of said payment devices for which said offline authentication is not supported to be used at said specific merchant, to obtain said further-refined whitelist; and
making said further-refined whitelist available to a plurality of payment device readers in a second environment which is different from the first environment and which does not support real-time online authorization, via at least one of: said specific merchant, and a third party acting on behalf of said specific merchant, to permit inferring said offline authentication of said subset of said payment devices for which said offline authentication is not supported, in said second environment.

2. The method of claim 1, wherein said gathering comprises gathering for at least one of authorization requests, authorization responses, and clearing messages.

3. The method of claim 1, wherein said gathering, filtering, and making available steps are carried out without requiring deliberate action by holders of said payment devices for which offline authentication is not supported, other than normal usage thereof.

4. The method of claim 1, wherein said making available step comprises providing directly from an operator of said payment processing network, which carries said plurality of successful payment device transactions, to said at least one of said specific merchant and said third party acting on behalf of said specific merchant.

5. The method of claim 1, wherein said making available step comprises providing from an operator of said payment processing network which carries said plurality of successful payment device transactions to said at least one of said specific merchant and said third party acting on behalf of said specific merchant via an acquirer of said specific merchant.

6. The method of claim 1, wherein said making available step comprises providing from an operator of said payment processing network which carries said plurality of successful payment device transactions to said specific merchant via a vendor which provides at least a portion of an access control solution to said specific merchant.

7. The method of claim 1, further comprising said at least one of said specific merchant and said third party acting on behalf of said specific merchant inferring authentication for at least one payment device of said subset of said payment devices, based on presence of said at least one payment device of said subset of said payment devices on said whitelist provided to said specific merchant.

8. The method of claim 7, wherein said specific merchant is a transit system and wherein said specific merchant or said third party takes at least one action in response to inferring authentication, wherein said at least one action comprises allowing access to said transit system.

9. The method of claim 1, further comprising said at least one of said specific merchant and said third party acting on behalf of said specific merchant making a risk management decision for at least one payment device of said subset of said payment devices, based, at least in part, on presence of said at least one payment device of said subset of said payment devices on said whitelist.

10. The method of claim 1, further comprising said at least one of said specific merchant and said third party acting on behalf of said specific merchant distributing said whitelist to said plurality of payment device readers, said plurality of payment device readers being operated at least one of:
by said specific merchant; and
on behalf of said specific merchant.

11. The method of claim 1, wherein:
said gathering, filtering, and making available steps are carried out by an operator of said payment processing network which carries said plurality of successful payment device transactions; and
said transaction data for said plurality of successful payment device transactions is received by said operator over said payment processing network.

12. The method of claim 11, further comprising providing a system, wherein the system comprises distinct software modules, each of the distinct software modules being embodied on a non-transitory computer-readable storage medium, and wherein the distinct software modules comprise a database module and a propensity modeling engine module;
wherein:
in said gathering step, said transaction data for said plurality of successful payment device transactions is stored using said database module executing on said at least one hardware processor located at said node of said payment processing network; and
said filtering step is carried out by said propensity modeling engine module executing on said at least one hardware processor located at said node of said payment processing network.

13. An apparatus comprising:
means for gathering transaction data for a plurality of successful payment device transactions in a first environment, said successful payment device transactions being carried over a payment processing network;
means for filtering said transaction data to identify successful payment device transactions associated with payment devices for which offline authentication is not supported, to obtain a whitelist, wherein said filtering is carried out by at least one hardware processor located at a node of said payment processing network;
means for carrying out propensity modeling on said whitelist to identify a subset of said payment devices for which said offline authentication is not supported which are more likely than a remainder of said payment devices for which said offline authentication is not supported to be used at a specific merchant, to obtain a further-refined whitelist, said means for carrying out propensity modeling in turn comprising:
means for said at least one hardware processor conducting a learning process with an artificial neural network analyzer; and
means for said at least one hardware processor applying said artificial neural network analyzer which has undergone said learning process to said successful payment device transactions associated with said payment devices for which said offline authentication is not supported to identify said subset of said payment devices for which said offline authentication is not supported which are more likely than said remainder of said payment devices for which said offline authentication is not supported to be used at said specific merchant, to obtain said further-refined whitelist; and
means for making said further-refined whitelist available to a plurality of payment device readers in a second environment which is different from the first environment and which does not support real-time online authorization, via at least one of: said specific merchant, and a third party acting on behalf of said specific merchant, to permit inferring said offline authentication of said subset of said payment devices incapable of said offline authentication, in said second environment.

14. An apparatus comprising:
a memory;
at least one hardware processor, operatively coupled to said memory, and located at a node of a payment processing network; and
a persistent storage device operatively coupled to said memory and storing in a non-transitory manner instructions which when loaded into said memory cause said at least one processor to be operative to:
gather transaction data for a plurality of successful payment device transactions in a first environment, said successful payment device transactions being carried over said payment processing network;
filter said transaction data to identify successful payment device transactions associated with payment devices for which offline authentication is not supported, to obtain a whitelist;

carry out propensity modeling on said whitelist to identify a subset of said payment devices for which said offline authentication is not supported which are more likely than a remainder of said payment devices for which said offline authentication is not supported to be used at a specific merchant, to obtain a further-refined whitelist, said propensity modeling in turn comprising:

said at least one hardware processor conducting a learning process with an artificial neural network analyzer; and said at least one hardware processor applying said artificial neural network analyzer which has undergone said learning process to said successful payment device transactions associated with said payment devices for which said offline authentication is not supported to identify said subset of said payment devices for which said offline authentication is not supported which are more likely than said remainder of said payment devices for which said offline authentication is not supported to be used at said specific merchant, to obtain said further-refined whitelist; and make said further-refined whitelist available to a plurality of payment device readers in a second environment which is different from the first environment and which does not support real-time online authorization, via at least one of: said specific merchant, and a third party acting on behalf of said specific merchant, to permit inferring said offline authentication of said subset of said payment devices for which said offline authentication is not supported, in said second environment.

15. The apparatus of claim 14, wherein said gathering comprises gathering for at least one of authorization requests, authorization responses, and clearing messages.

16. The apparatus of claim 14, wherein said gathering, filtering, and making available are carried out without requiring deliberate action by holders of said payment devices for which offline authentication is not supported, other than normal usage thereof.

* * * * *